(12) United States Patent
Foody et al.

(10) Patent No.: US 8,273,181 B2
(45) Date of Patent: Sep. 25, 2012

(54) PROCESS OF REMOVING CALCIUM AND OBTAINING SULFATE SALTS FROM AN AQUEOUS SUGAR SOLUTION

(75) Inventors: Brian E. Foody, Ontario (CA); Jeffrey S. Tolan, Ontario (CA)

(73) Assignee: Iogen Energy Corporation, Ontario (CA)

( * ) Notice: Subject to any disclaimer, the term of this patent is extended or adjusted under 35 U.S.C. 154(b) by 1031 days.

(21) Appl. No.: 12/199,976

(22) Filed: Aug. 28, 2008

(65) Prior Publication Data
US 2009/0056707 A1 Mar. 5, 2009

Related U.S. Application Data

(60) Provisional application No. 60/969,004, filed on Aug. 30, 2007.

(51) Int. Cl.
*C13B 20/00* (2006.01)
(52) U.S. Cl. .................................................. 127/46.2
(58) Field of Classification Search .................. None
See application file for complete search history.

(56) References Cited

U.S. PATENT DOCUMENTS

| | | | | |
|---|---|---|---|---|
| 3,887,391 | A * | 6/1975 | Schoenrock et al. | 127/46.2 |
| 4,046,590 | A | 9/1977 | Riffer | |
| 4,075,406 | A | 2/1978 | Melaja et al. | |
| 4,140,541 | A | 2/1979 | Popper | |
| 4,165,240 | A | 8/1979 | Enokizono et al. | |
| 4,263,052 | A * | 4/1981 | Bichsel et al. | 127/41 |
| 4,329,183 | A | 5/1982 | Rousseau et al. | |
| 5,094,694 | A | 3/1992 | La Brie et al. | |
| 5,177,008 | A | 1/1993 | Kampen | |
| 5,407,580 | A * | 4/1995 | Hester et al. | 210/635 |
| 5,443,650 | A | 8/1995 | Saska et al. | |
| 5,624,500 | A | 4/1997 | Sanjuan Diaz | |
| 6,043,392 | A * | 3/2000 | Holtzapple et al. | 562/513 |
| 6,709,527 | B1 | 3/2004 | Fechter et al. | |
| 2005/0244934 | A1 * | 11/2005 | Foody et al. | 435/101 |

(Continued)

FOREIGN PATENT DOCUMENTS
DE 241800 C2 11/1974
(Continued)

OTHER PUBLICATIONS

Dowex, ion exchange resins, 1998.*
(Continued)

*Primary Examiner* — Melvin C Mayes
*Assistant Examiner* — Stefanie Cohen
(74) *Attorney, Agent, or Firm* — Fitzpatrick, Cella, Harper & Scinto

(57) ABSTRACT

The present invention provides a process for obtaining a product stream comprising one or more sulfate salts of potassium, sodium or ammonium from a sugar stream resulting from [processing a lignocellulosic feedstock, said sugar stream which includes calcium sulfate and one or more of these sulfate salts. The process comprises (i) treating the sugar stream to remove calcium, thereby producing a sugar stream containing substantially no calcium, and obtaining a salt stream comprising a calcium salt; (ii) choosing a feed stream that is either (a) a clarified salt stream derived from the salt stream of step (i) after removal of calcium therefrom; or (b) the sugar stream containing substantially no calcium that is produced in step (i); (iii) introducing the feed stream chosen in step (ii) to an ion exchange bed; and (iv) regenerating the ion exchange resin bed of step (iii) with sulfuric acid to produce the product stream.

63 Claims, 16 Drawing Sheets

U.S. PATENT DOCUMENTS

2008/0056983 A1    3/2008    Curren et al.

FOREIGN PATENT DOCUMENTS

| WO | 2005099854 | 10/2005 |
| WO | 2006007691 | 1/2006 |
| WO | 2008025166 | 3/2008 |

OTHER PUBLICATIONS

Kearney, M. et al., Weak Cation Exchange Softening: Long Term Experience and Recent Developments; Published in Proceedings from the 32nd Biennial ASSBT Meeting, Feb. 26-Mar. 1, 2003: 1-9.

* cited by examiner

PROCESS OF REMOVING CALCIUM AND OBTAINING SULFATE SALTS FROM AN AQUEOUS SUGAR SOLUTION

RELATED APPLICATIONS

This application claims the priority benefit of a provisional application entitled "Method of Obtaining Sulfate Salts From an Aqueous Sugar Solution" Ser. No. 60/969,004 filed Aug. 30, 2007, the entire contents of which are incorporated by reference herein.

FIELD OF THE INVENTION

The present invention relates to an improved process for treating a sugar solution to remove calcium and obtain sulfate salts. More specifically, the present invention relates to treating a sugar solution comprising calcium sulfate and at least one sulfate salt of potassium, sodium and ammonium.

BACKGROUND OF THE INVENTION

Fuel ethanol is currently produced from feedstocks such as corn starch, sugar cane, and sugar beets. However, the potential for production of ethanol from these sources is limited as most of the farmland which is suitable for the production of these crops is already in use as a food source for humans. Furthermore, the production of ethanol from these feedstocks produces greenhouse gases because fossil fuels are used in the conversion process.

The production of ethanol from cellulose-containing feedstocks, such as agricultural wastes, grasses, and forestry wastes, has received much attention in recent years. The reasons for this are that these feedstocks are widely available and inexpensive and their use for ethanol production provides an alternative to burning or land filling lignocellulosic waste materials. Moreover, a byproduct of cellulose conversion, lignin, can be used as a fuel to power the process instead of fossil fuels. Several studies have concluded that, when the entire production and consumption cycle is taken into account, the use of ethanol produced from cellulose generates close to nil greenhouse gases.

The three primary constituents of lignocellulosic feedstocks are cellulose, which comprises 30% to 50% of most of the key feedstocks; hemicellulose, which comprises 15% to 35% of most feedstocks, and lignin, which comprises 15% to 30% of most feedstocks. Cellulose and hemicellulose are comprised primarily of carbohydrates and are the source of sugars that can potentially be fermented to ethanol. Lignin is a phenylpropane lattice that is not converted to ethanol.

Cellulose is a polymer of glucose with beta-1,4 linkages and this structure is common among the feedstocks of interest. Hemicellulose has a more complex structure that varies among the feedstocks. For the feedstocks which are typically of interest, the hemicellulose typically consists of a backbone polymer of xylose with beta-1,4 linkages, with side chains of 1 to 5 arabinose units with alpha-1,3 linkages, or acetyl moieties, or other organic acid moieties such as glucuronyl groups.

The first process step for converting lignocellulosic feedstock to ethanol involves breaking down the fibrous material. The two primary processes are acid hydrolysis, which involves the hydrolysis of the feedstock using a single step of acid treatment, and enzymatic hydrolysis, which involves an acid pretreatment followed by hydrolysis with cellulase enzymes.

In the acid hydrolysis process, the feedstock is subjected to steam and a mineral acid, such as sulfuric acid, hydrochloric acid, or phosphoric acid. The temperature, acid concentration and duration of the acid hydrolysis are sufficient to hydrolyze the cellulose and hemicellulose to their monomeric constituents, which is glucose from cellulose and xylose, galactose, mannose, arabinose, acetic acid, galacturonic acid, and glucuronic acid from hemicellulose. Sulfuric acid is the most common mineral acid for this process. The sulfuric acid can be concentrated (25-80% w/w) or dilute (3-8% w/w). The resulting aqueous slurry contains unhydrolyzed fiber that is primarily lignin, and an aqueous solution of glucose, xylose, organic acids, including primarily acetic acid, but also glucuronic acid, formic acid, lactic acid and galacturonic acid, and the mineral acid.

In the enzymatic hydrolysis process, the steam temperature, mineral acid (typically sulfuric acid) concentration and treatment time of the acid pretreatment step are chosen to be milder than that in the acid hydrolysis process. Similar to the acid hydrolysis process, the hemicellulose is hydrolyzed to xylose, galactose, mannose, arabinose, acetic acid, glucuronic acid, formic acid and galacturonic acid. However, the milder pretreatment does not hydrolyze a large portion of the cellulose, but rather increases the cellulose surface area as the particle size of the fibrous feedstock is reduced. The pretreated cellulose is then hydrolyzed to glucose in a subsequent step that uses cellulase enzymes. Prior to the addition of enzyme, the pH of the acidic feedstock is adjusted to a value that is suitable for the enzymatic hydrolysis reaction. Typically, this involves the addition of alkali to a pH of between about 4 and about 6, which is the optimal pH range for cellulases, although the pH can be higher if alkalophilic cellulases are used.

In addition to cellulose, hemicellulose, and lignin, lignocellulosic feedstocks contain many other organic and inorganic compounds. Among the most common inorganic compounds are salts of calcium. It is desirable to remove calcium from the process streams, because salts such as calcium sulfate have a low solubility in water and can therefore precipitate on process equipment. Such precipitation can decrease the efficiency of a process and can cause a unit operation or a plant to shut down to remove it.

During the processing of lignocellulosic feedstocks to ethanol, other inorganic salts are produced that can potentially be recovered and sold as commercial products. Recovering these salts is advantageous in that it provides a source of revenue for the plant and offsets the cost of the chemicals used during the chemical processing steps. Of particular value are sulfate salts, including potassium sulfate, sodium sulfate and ammonium sulfate, as they find use as agricultural fertilizers. Alternatively, in regions where fertilizer usage is limited, ammonium sulfate salt recovered from the process may be decomposed to produce sulfuric acid and sulfate salt, which may then be recovered for use in earlier stages of the process or for sale as commercial products as described in co-pending U.S. application No. 60/824,142 (Curren et al.).

Sulfate salts can arise at various stages of processing of the lignocellulosic feedstock. For example, sulfate salts of potassium, calcium, magnesium and sodium are formed during pretreatment by reaction of the sulfuric acid with salts present in the feedstock, while sulfate salts of ammonium, sodium, or potassium are produced at high concentrations upon neutralization of the sulfuric acid present in the pretreated feedstock with ammonium hydroxide, sodium hydroxide, or potassium hydroxide, respectively, prior to cellulase hydrolysis. Sulfate salts may also arise in process streams obtained from strong acid hydrolysis with sulfuric acid.

In order effectively to utilize sulfate salts as a fertilizer, or for other applications, it is first necessary to separate them from other components of the sugar stream. In this connection, it has been proposed to subject sugar streams containing sulfate salts to ion exclusion as disclosed by WO 2005/099854 (Foody et al.). This separation technique uses ion exchange resins with the charge on the resin matching that of the target ions in the solution, thereby excluding them from the resin. The excluded compounds then elute from the column readily, while uncharged compounds absorb into the resin and elute from the column more slowly. The method of Foody et al. (supra) involves the separation of sulfate salts by ion exclusion from an aqueous process stream containing glucose, xylose and arabinose sugars obtained from sulfuric acid pretreatment. In particular, a salt raffinate stream containing sodium sulfate, potassium sulfate, magnesium sulfate, and possibly calcium sulfate and a separate sugar product stream, which contained the vast majority of the organic compounds, were obtained from the process. The Foody et al. process does not separate calcium sulfate from the other sulfate salts. Therefore, further processing of the salt raffinate stream would run the risk of precipitation of calcium sulfate. In addition, the use of ion exclusion by Foody et al. is inefficient, in that it requires large equipment to carry out ion exclusion with several hours of liquid residence time. Ion exclusion also requires the addition of large amounts of water to desorb organic compounds from the resin. This results in a high degree of dilution of the sugar and salt streams.

The isolation of potassium sulfate from process streams by crystallization is known as disclosed by U.S. Pat. No. 5,177,008 (Kampen). In particular, the process involves fermenting the raw material, collecting the ethanol by distillation and then crystallizing the potassium from the remaining still bottoms. However, since Kampen et al. used sugar beets, they were able to crystallize potassium sulfate directly from the still bottoms. By contrast, acid pretreatment of lignocellulosic feedstocks results in mixtures of inorganic salts in the still bottoms that cannot be directly crystallized.

Another method of removing inorganic salts from process streams is ion exchange, which involves the exchange of cations or anions in an aqueous stream with cations or anions on the resins, followed by a subsequent regeneration step to displace the adsorbed species and regenerate the resin. During cation exchange, the resin binds the cations in the feed stream, while neutral compounds, such as sugars and acids, pass through the column in a low-affinity stream. After a certain volume of the process stream has been fed, the resin is saturated and is then regenerated. This is then accomplished using a regenerant solution, which is passed through the resin to convert the cation exchange resin back to its original form. This produces salts from the cations adsorbed to the resin. For example, when hydrochloric acid is used as a regenerant, the resin is converted to the hydrogen form. Soluble chloride salts are formed in the regeneration stream upon reaction of the hydrochloric acid with adsorbed cations.

It is known to demineralize sugar solutions by ion exchange during sugar refining processes to remove ionic impurities (See, for example, U.S. Pat. Nos. 5,443,650, 4,329,183, 6,709,527, 4,165,240, 4,140,541, 5,624,500 and 5,094,694). In particular, these demineralization processes involve passing the sugar solution through a strongly acidic cation exchange resin to remove cationic impurities, followed by passage through a strongly basic anion exchanger to remove anions in a similar manner. The regeneration streams from the ion exchange operations may optionally be utilized in fertilizers as disclosed, for example, in U.S. Pat. Nos. 6,709,527, 4,140,541, 6,709,527 and 5,624,500.

German Patent No. 2418800C2 (Meleja et al.) discloses a process employing ion exchange to purify a hemicellulose hydrolyzate obtained from an acid treatment of beech wood chips. The process involves first hydrolyzing the chips with sulfuric acid, followed by rinsing with water, removal of the pulp from the hydrolyzate and neutralization of the hydrolyzate with sodium hydroxide. The neutralized hydrolyzate was reported to contain $Na_2SO_4$, as well as xylose and other sugars resulting from the hydrolysis. The hydrolyzate was then heated and subjected to desalination and ion exchange cleaning steps by passing the solution through successive beds of a strong cation exchanger. The sugar fraction, which contained primarily xylose, and small amounts of $Na_2SO_4$, was subsequently subjected to a further cleaning step by running the solution through the successive beds of a decolorizing resin, a strong cation exchanger and a weak anion exchanger. The process disclosed resulted in a xylose solution which was of sufficiently high purity to obtain a high-purity xylitol solution from catalytic hydrogenation of the xylose. However, there is no disclosure of methods for recovering the sulfate salts from the process; rather, the process is directed to producing xylose as the product of the separation.

It is known to demineralize sugar solutions by treating them with cation exchange resins using sulfuric acid as a regenerant. The use of sulfuric acid as a regenerant is particularly advantageous in that it is inexpensive and produces high-value sulfate salts. Such a process is disclosed in a paper by Kearney and Rearick which involves softening sugar beet juice using a weak cation exchange process. (Entitled "Week Cation Exchange Softening: Long Term Experience and Recent Developments" (ASSBT 2003) Published in Proceedings from the $32^{nd}$ Biennial ASSBT Meeting, Operations, San Antonio, Tex., Feb. 26-Mar. 1, 2003). During regeneration of the cation exchange resin, the sulfuric acid regenerant is converted to calcium sulfate, which is then re-used in an earlier stage in the processing of the sugar beets referred to therein as "pulp pressing".

Similarly, U.S. Pat. No. 4,046,590 discloses a process for producing a colourless, low-ash, high-purity sugar syrup from cane molasses involving cation exchange with a regenerant solution of sulfuric acid. In particular, the process involved subjecting acidified cane molasses to ion exclusion, de-ashing with cation exchange using sulfuric acid as the regenerant, followed by removal of anions by anion exchange.

However, a disadvantage of processes employing sulfuric acid as a regenerant during cation exchange is that $CaSO_4$ produced during the regeneration has a very low solubility of around 2 g/L, the precise value depending on the temperature and pH. With the use of sulfuric acid regenerant solutions of 20 to 150 g/L, it is likely that $CaSO_4$ forms and precipitates within the resin bed and in the cation exchange equipment. These precipitates interfere with the ion exchange process and the flow of feed onto the column, and are difficult and expensive to remove from the resin bed.

Thus, to date, there has not been an effective method for removing calcium and obtaining sulfate salts from sugar streams resulting from the processing of lignocellulosic feedstocks. The removal of calcium avoids problems with calcium precipitation in downstream processes. The ability to recover the sulfate salts from sugar solutions represents a large opportunity to avoid the cost of their disposal and can lower process costs by providing a product that can be sold as a fertilizer or used for other applications.

SUMMARY OF THE INVENTION

The present invention seeks to overcome several disadvantages of the prior art by taking into account the difficulties encountered in steps carried out during the processing of sugar streams resulting from the hydrolysis of lignocellulosic feedstocks to obtain sulfate salts.

It is an object of the invention to provide an improved process for the processing of sugar streams.

Consistent with the above aims, the present invention involves the processing of a sugar stream containing calcium sulfate and one or more sulfate salts of potassium, ammonium, or sodium. The processing of the sugar stream results in the substantially-complete removal of the calcium from the sugar stream and the recovery of one or more sulfate salts of potassium, ammonium, and sodium from the sugar stream. The calcium is removed from the sugar stream and processed in a manner that avoids the production of concentrated calcium sulfate during the feeding or regeneration of an ion exchange system. This is critical because calcium sulfate can precipitate and foul process equipment. The production of the monovalent sulfate salts is valuable because these salts have commercial markets such as fertilizer or can be converted into other products. The removal of calcium and other cations from the sugar stream is advantageous in improving the downstream processing of the stream, by avoiding calcium precipitation and by providing a stream that is more suitable for anion exchange.

STATEMENTS OF INVENTION

One broad aspect of the present invention provides a process for obtaining a product stream comprising one or more sulfate salts of monovalent cations selected from the group consisting of potassium, sodium, ammonium, and combinations thereof, from a sugar stream resulting from the hydrolysis of a lignocellulosic feedstock, said sugar stream comprising calcium sulfate and one or more sulfate salts of the monovalent cations. The process comprises the steps of: (i) treating the sugar stream to remove calcium, thereby producing a sugar stream containing substantially no calcium ions, and obtaining a salt stream comprising a calcium salt; (ii) choosing a feed stream that is either (a) a clarified salt stream derived from the salt stream of step (i) after precipitation and removal of calcium therefrom or (b) the sugar stream containing substantially no calcium ions that is produced in step (i) and wherein the feed stream contains the one or more salts of the monovalent cations; (iii) introducing the feed stream chosen in step (ii) to an ion exchange resin bed; and (iv) regenerating the ion exchange resin bed of step (iii) with sulfuric acid to produce a product stream comprising one or more sulfate salts of monovalent cations selected from the group consisting of potassium, sodium, ammonium, and combinations thereof.

A second broad aspect of the present invention provides a process for obtaining a product stream comprising one or more sulfate salts of monovalent cations selected from the group consisting of potassium, sodium, ammonium, and combinations thereof, from a sugar stream resulting from the hydrolysis of a lignocellulosic feedstock, the sugar stream comprising calcium sulfate and one or more sulfate salts of the monovalent cations. The process comprises the steps of: (i) treating the sugar stream to remove calcium by passing the sugar stream through a cation exchange resin bed to bind calcium to the resin bed, thereby producing a sugar stream containing substantially no calcium ions, wherein cations of one or more of the sulfate salts of the monovalent cations present in the sugar stream comprising calcium sulfate also bind to the resin bed, and a salt stream comprising a calcium salt is obtained by regenerating the cation exchange resin bed with a regenerant to form a regenerated stream comprising one or more soluble salts of the monovalent cations bound to said resin and a soluble calcium salt; (ii) obtaining a clarified salt stream derived from the regenerated stream of step (i) after precipitation and removal of calcium therefrom, the clarified salt stream comprising at least one of potassium, ammonium and sodium salts; (iii) introducing the clarified salt stream of step (ii) to a cation exchange resin bed; and (iv) regenerating the cation exchange resin bed of step (iii) with sulfuric acid to produce the product stream.

A third broad aspect of the present invention provides a process for obtaining a product stream comprising one or more sulfate salts of monovalent cations selected from the group consisting of potassium, sodium, ammonium, and combinations thereof, from a sugar stream resulting from the hydrolysis of a lignocellulosic feedstock, the sugar stream comprising calcium sulfate and one or more sulfate salts of the monovalent cations. The process comprises the steps of: (i) treating the sugar stream to remove calcium by passing the sugar stream through a cation exchange resin bed to bind calcium to the resin bed, thereby producing a sugar stream containing substantially no calcium ions and containing one or more of the monovalent cations present in the sugar stream comprising calcium sulfate; (ii) introducing the sugar stream containing substantially no calcium ions of step (i) to a cation exchange resin bed; (iii) regenerating the cation exchange resin bed of step (ii) with sulfuric acid to produce the product stream; and (iv) regenerating the cation exchange resin bed of step (i) with a regenerant to form a regenerated stream comprising a soluble calcium salt.

A fourth broad aspect of the present invention provides a process for obtaining a product stream comprising one or more sulfate salts of monovalent cations selected from the group consisting of potassium, sodium, ammonium, and combinations thereof, from a sugar stream resulting from the hydrolysis of a lignocellulosic feedstock, the sugar stream comprising calcium sulfate and one or more sulfate salts of the monovalent cations. The process comprises the steps of: (i) treating the sugar stream to remove calcium by passing the sugar stream through a chelating resin bed to bind calcium to the resin bed, thereby producing a sugar stream containing substantially no calcium ions and containing one or more of the sulfate salts of the monovalent cations present in the sugar stream comprising calcium sulfate; (ii) introducing the sugar stream containing substantially no calcium ions of step (i) to a cation exchange resin bed; (iii) regenerating the cation exchange resin bed of step (ii) with sulfuric acid to produce the product stream; and (iv) regenerating the chelating resin bed of step (i) with a regenerant to form a regenerated stream comprising a soluble calcium salt thereof.

By a first feature of the first aspect of the present invention, the ion exchange resin bed of step (iii) is a cation exchange resin bed.

By another feature of the first aspect of the present invention, the step of treating the sugar stream to remove calcium (step (i)) comprises passing the sugar stream comprising calcium sulfate through a cation exchange resin bed to bind calcium and monovalent cations of the one or more sulfate salts present in the sugar stream to the cation exchange resin bed and obtaining the sugar stream containing substantially no calcium ions from the cation exchange resin bed; the salt stream comprising the calcium salt is obtained by regenerating the cation exchange resin bed with a regenerant to form a regenerated stream comprising one or more soluble salts of the monovalent cations bound to the resin and a soluble calcium salt; the clarified salt stream is produced by precipitating and removing calcium from the regenerated stream;

and the feed stream of step (iii) comprising the one or more salts of the monovalent cations is the clarified salt stream.

By one variant of that feature of the first aspect of the present invention, the ion exchange resin bed of step (iii) is a cation exchange resin bed.

By another variant of that feature of the first aspect of the present invention, the regenerant for regenerating the cation exchange resin bed of step (i) is an acid.

By another variant of that feature of the first aspect of the present invention, the acid is hydrochloric acid, and said regenerated stream comprises potassium chloride and calcium chloride, especially where the regenerated stream further comprises ammonium chloride.

By another variant of that feature of the first aspect of the present invention, the sugar stream comprising calcium sulfate further comprises magnesium sulfate, the regenerated stream further comprises soluble magnesium salts, and the process further comprises precipitating magnesium present in the regenerated stream.

By another variant of that feature of the first aspect of the present invention, calcium is precipitated from the regenerated stream by addition of carbon dioxide to the regenerated stream.

By another variant of that feature of the first aspect of the present invention, calcium is precipitated from the regenerated stream by addition of a carbonate salt to the regenerated stream.

By a variation of that variant of that feature of the first aspect of the present invention, an alkali is added in combination with the carbon dioxide and the alkali is selected from the group consisting of ammonium hydroxide, potassium hydroxide, sodium hydroxide and ammonia, especially where the alkali is ammonia and the insoluble calcium salt formed is calcium carbonate.

By another variant of that feature of the first aspect of the present invention 2 calcium precipitated from the regenerated stream is removed by a solids-liquid separation technique selected from the group consisting of centrifugation, microfiltration, plate and frame filtration, crossflow filtration, pressure filtration, vacuum filtration and settling.

By another variant of that feature of the first aspect of the present invention the regenerated stream comprises a portion of the acid used for regenerating and some or all of said portion of the acid is recovered.

By a variation of that variant of that feature of the first aspect of the present invention some or all of the recovered acid is used to regenerate the cation exchange resin bed.

By a variant of that feature of the first aspect of the present invention the acid used for regenerating is hydrochloric acid.

By another feature of the first aspect of the present invention, the sugar stream comprising calcium sulfate is obtained by pretreating the lignocellulosic feedstock with sulfuric acid.

By another feature of the first aspect of the present invention, the sugar stream comprising calcium sulfate further comprises sulfuric acid.

By another feature of the first aspect of the present invention, the sugar stream comprising calcium sulfate comprises xylose.

By another feature of the first aspect of the present invention, the sugar stream comprising calcium sulfate comprises magnesium sulfate, potassium sulfate and sodium sulfate.

By another feature of the first aspect of the present invention, the sugar stream comprising calcium sulfate further comprises ammonium sulfate.

By another feature of the first aspect of the present invention, the step of treating the sugar stream to remove calcium comprises feeding the sugar stream comprising calcium sulfate to a resin bed that binds at least calcium, and the step of obtaining the salt stream comprising a calcium salt comprises regenerating the resin bed with a regenerant to produce a regenerated stream comprising a soluble calcium salt.

By one variant of that feature of the first aspect of the present invention the resin bed that binds at least calcium is an ion exchange resin bed.

By another variant of that feature of the first aspect of the present invention the ion exchange resin bed that binds at least calcium is a chelating resin bed or a cation exchange resin bed.

By another feature of the first aspect of the present invention, the step of treating the sugar stream to remove calcium comprises precipitating calcium in the sugar stream comprising calcium sulfate to form an insoluble calcium precipitate; and removing the insoluble calcium precipitate therefrom to obtain the sugar stream containing substantially no calcium ions; and wherein the stream fed to the ion exchange resin bed of step (iii) is the sugar stream containing substantially no calcium.

By one variant of that feature of the first aspect of the present invention the ion exchange resin bed of step (iii) is a cation exchange resin bed.

By another variant of that feature of the first aspect of the present invention the precipitation of calcium is carried out by adding to the sugar stream comprising calcium sulfate an alkali selected from the group consisting of potassium hydroxide, sodium hydroxide, ammonium hydroxide, ammonia and combinations thereof and carbon dioxide together or in combination, or by adding to the sugar stream comprising calcium sulfate a carbonate salt to produce a calcium carbonate precipitate.

By another variant of that feature of the first aspect of the present invention the sugar stream resulting from the hydrolysis of a lignocellulosic feedstock comprises magnesium sulfate, and the process further comprises precipitating magnesium carbonate together with calcium carbonate from said sugar stream.

By another variant of that feature of the first aspect of the present invention the step of treating the sugar stream to remove calcium (step (i)) comprises passing the sugar stream comprising calcium sulfate through a resin bed that binds at least calcium present in the sugar stream to obtain the sugar stream containing substantially no calcium ions, which sugar stream containing substantially no calcium ions further comprises one or more sulfate salts of monovalent cations selected from the group consisting of potassium, sodium, ammonium, and combinations thereof; and the feed stream comprising the one or more salts of the monovalent cations fed to the ion exchange resin bed of step (iii) is the sugar stream containing substantially no calcium ions.

By another variant of that feature of the first aspect of the present invention the resin bed in the step of treating the sugar stream to remove calcium (step (i)) is a cation exchange resin bed and the sugar stream containing substantially no calcium ions comprises ammonium sulfate, potassium sulfate or a combination thereof.

By another variant of that feature of the first aspect of the present invention the salt stream comprising a calcium salt is obtained by regenerating the cation exchange resin bed of step (i) with a regenerant to form a regenerated stream comprising one or more soluble salts of cations bound to the resin bed, the regenerated stream comprises a soluble calcium salt; and the process further comprises precipitating calcium present in the regenerated stream to form an insoluble calcium precipitate, and removing the insoluble calcium precipitate therefrom to obtain a salt stream comprising the insoluble calcium precipitate and a clarified salt stream.

By a variation of that variant of that feature of the first aspect of the present invention calcium is precipitated from the regenerated stream by addition of carbon dioxide to the regenerated stream.

By another variation of that variant of that feature of the first aspect of the present invention calcium is precipitated from the regenerated stream by addition of a carbonate salt to the regenerated stream.

By another variation of that variant of that feature of the first aspect of the present invention an alkali is added in combination with the carbon dioxide and wherein said alkali is selected from the group consisting of ammonium hydroxide, potassium hydroxide, sodium hydroxide and ammonia, especially where the alkali is ammonia and the insoluble calcium salt formed is calcium carbonate.

By another variation of that variant of that feature of the first aspect of the present invention calcium precipitated from the regenerated stream is removed by a solids-liquid separation technique selected from the group consisting of centrifugation, microfiltration, plate and frame filtration, crossflow filtration, pressure filtration, vacuum filtration and settling.

By another variation of that variant of that feature of the first aspect of the present invention the regenerant used to regenerate the cation exchange resin bed of step (i) is a regenerant solution comprising one or more chloride salts and wherein said clarified salt stream is a solution comprising ammonium chloride, potassium chloride or a combination thereof, especially where the regenerant solution used to regenerate the cation exchange resin bed is the clarified salt stream comprising ammonium chloride, potassium chloride or a combination thereof, and/or where the clarified salt stream comprising ammonium chloride, potassium chloride or a combination thereof is concentrated by removing water therefrom prior to said clarified salt stream being used to regenerate the cation exchange resin bed.

By another variant of that feature of the first aspect of the present invention the step of treating the sugar stream comprising calcium sulfate to remove calcium (step (i)) comprises passing the sugar stream through a chelating resin bed that binds calcium ions, and wherein the sugar stream containing substantially no calcium ions further comprises potassium sulfate.

By a variation of that variant of that feature of the first aspect of the present invention the sugar stream containing substantially no calcium ions further comprises ammonium sulfate.

By another variant of that feature of the first aspect of the present invention the resin bed that binds at least calcium is a chelating resin bed and the chelating resin bed is regenerated to produce a regenerated stream comprising a soluble calcium salt.

By variations of that variant of that feature of the first aspect of the present invention the sugar stream containing substantially no calcium ions comprises potassium sulfate., or the sugar stream containing substantially no calcium ions comprises ammonium sulfate and potassium sulfate or the chelating resin bed is regenerated with an acid, especially where the acid is hydrochloric acid and the soluble calcium salt is calcium chloride.

By another variation of that variant of that feature of the first aspect of the present invention the regenerated stream comprising the soluble calcium salt further comprises a portion of the hydrochloric acid used to regenerate the chelating resin bed and wherein the regenerated stream is treated with calcium hydroxide to convert some or all of said portion of the hydrochloric acid to calcium chloride.

By another variation of that variant of that feature of the first aspect of the present invention the process further comprises treating the regenerated stream comprising the soluble calcium salt to precipitate calcium and form an insoluble calcium precipitate; and removing said insoluble calcium precipitate therefrom to obtain a salt stream comprising the insoluble calcium precipitate and a clarified salt stream and at least one salt of a monovalent cation.

By another variation of that variant of that feature of the first aspect of the present invention the at least one salt of a monovalent cation present in the clarified salt stream is produced during said step of treating the regenerated stream to precipitate calcium by addition of carbon dioxide and an alkali containing a monovalent cation, or by addition of a carbonate salt containing a monovalent cation.

By another variation of that variant of that feature of the first aspect of the present invention the at least one salt of a monovalent cation present in the clarified salt stream is converted to its sulfate salt by passing the clarified salt stream through a cation exchange resin bed to bind cations and wherein the cation exchange resin bed is regenerated with sulfuric acid to convert cations bound to the cation exchange resin bed to their sulfate salts, especially where a stream comprising acid is obtained by passing the clarified salt stream through the cation exchange resin bed and/or where some or all of the stream comprising acid is used to regenerate the chelating resin bed and preferably where the acid in the stream comprising an acid is hydrochloric acid.

By another variant of that feature of the first aspect of the present invention the sugar stream resulting from the hydrolysis of a lignocellulosic feedstock comprises magnesium sulfate and potassium sulfate; treating the sugar stream to remove calcium comprises passing the sugar stream through a cation exchange resin bed, bound with cations comprising potassium, to bind calcium, magnesium and potassium ions of the sulfate salts present in the sugar stream to the resin bed to obtain the sugar stream comprising substantially no calcium ions, and the sugar stream comprises potassium sulfate; the salt stream comprising the calcium salt is obtained by regenerating the cation exchange resin bed with a solution containing potassium chloride to obtain a regenerated stream comprising calcium chloride, magnesium chloride and potassium chloride; the process further comprises precipitating calcium carbonate and magnesium carbonate from the regenerated stream by adding to the regenerated stream an alkali selected from the group consisting of potassium hydroxide, sodium hydroxide, ammonium hydroxide, ammonia and combinations thereof and carbon dioxide together or in combination, or by adding to the regenerated stream a carbonate salt to produce calcium carbonate and magnesium carbonate precipitates; removing the calcium carbonate and magnesium carbonate precipitates therefrom to produce a clarified salt stream, which clarified salt stream comprises potassium chloride; evaporating the clarified salt stream to obtain an evaporated salt stream comprising potassium chloride; and recirculating the evaporated salt stream comprising potassium chloride to regenerate the cation exchange resin bed, and wherein said feed stream comprising the one or more salts of the monovalent cations fed to the ion exchange resin bed of step (iii) is the sugar stream containing substantially no calcium ions, which ion exchange resin bed is a cation exchange resin bed.

By a feature of the second aspect of the present invention the regenerant for regenerating the cation exchange resin bed of step (i) comprises hydrochloric acid.

By a variant of that feature of the second aspect of the present invention the precipitation of calcium in step (ii) is carried out by adding to the regenerated stream an alkali selected from the group consisting of potassium hydroxide, sodium hydroxide, ammonium hydroxide, ammonia and combinations thereof and carbon dioxide together or in combination, or by adding to the regenerated stream a carbonate salt to produce a calcium carbonate precipitate.

By a feature of the third aspect of the present invention the regenerant for regenerating the cation exchange resin bed of step (i) comprises a monovalent chloride salt and the regenerated stream of step (iv) comprises calcium chloride.

By a variant of that feature of the third aspect of the present invention a clarified salt stream derived from the regenerated stream of step (iv) is obtained after precipitation and removal of calcium from the regenerated stream, the clarified salt stream comprising at least one of potassium, ammonium and sodium salts.

By another variant of that feature of the third aspect of the present invention the precipitation of calcium is carried out by adding to the regenerated stream an alkali selected from the group consisting of potassium hydroxide, sodium hydroxide, ammonium hydroxide, ammonia and combinations thereof and carbon dioxide together or in combination, or by adding to the regenerated stream a carbonate salt to produce a calcium carbonate precipitate.

By a variation of that variant of that feature of the third aspect of the present invention the regenerant for regenerating the cation exchange resin bed of step (i) comprises all or a portion of the clarified salt stream.

By a feature of the fourth aspect of the present invention the regenerant for regenerating the chelating resin bed of step (i) comprises hydrochloric acid and the regenerated stream of step (iv) comprises calcium chloride.

By another feature of the fourth aspect of the present invention a clarified salt stream derived from the regenerated stream of step (iv) is obtained after precipitation and removal of calcium from the regenerated stream, said clarified salt stream comprising at least one of potassium, ammonium and sodium salts.

By a feature of the fourth aspect of the present invention the precipitation of calcium is carried out by adding to the regenerated stream an alkali selected from the group consisting of potassium hydroxide, sodium hydroxide, ammonium hydroxide, ammonia and combinations thereof and carbon dioxide together or in combination, or by adding to the regenerated stream a carbonate salt to produce a calcium carbonate precipitate.

By a variation of that feature of the fourth aspect of the present invention all or a portion of the clarified salt stream is passed through a cation exchange resin bed that binds cations contained in the clarified salt stream and a stream comprising hydrochloric acid is produced.

By another variation of that feature of the fourth aspect of the present invention the regenerant for regenerating the chelating resin bed of step (i) comprises all or a portion of said stream comprising hydrochloric acid.

By another feature of the fourth aspect of the present invention the cation exchange resin bed that binds cations contained in the clarified salt stream is regenerated with sulfuric acid to produce one or more sulfate salts of potassium, ammonium or sodium or combinations.

DETAILED DESCRIPTION OF THE INVENTION

The following generalized description is by way of examples only and without limitation to the combination of features necessary for carrying the invention into effect.

The sugar stream processed according to embodiments of the present invention generally originates from the processing of a lignocellulosic feedstock. Representative lignocellulosic feedstocks include (1) agricultural wastes such as corn stover, wheat straw, barley straw, oat straw, rice straw, canola straw, and soybean stover; (2) grasses such as switch grass, miscanthus, cord grass, and reed canary grass; and (3) forestry wastes such as aspen wood and sawdust. These feedstocks contain high concentrations of cellulose and hemicellulose that are the source of the sugar in the aqueous stream.

Lignocellulosic feedstocks comprise cellulose in an amount greater than about 20%, more preferably greater than about 30%, more preferably greater than about 40% (w/w). For example, the lignocellulosic material may comprise from about 20% to about 50% (w/w) cellulose, or any amount between about 20% and about 50%. The lignocellulosic feedstock also comprises lignin in an amount greater than about 10%, more typically in an amount greater than about 15% (w/w). The lignocellulosic feedstock may also comprise small amounts of sucrose, fructose and starch.

The lignocellulosic feedstocks also comprise inorganic compounds, including salts of calcium and one or more of potassium, sodium, and ammonium. In a preferred embodiment, the lignocellulosic feedstocks of the invention comprise magnesium.

In one embodiment of the invention, the sugar stream is obtained by pretreatment of a lignocellulosic material. Pretreatment methods are intended to deliver a sufficient combination of mechanical and chemical action so as to disrupt the fiber structure and increase the surface area of feedstock to make it accessible to cellulase enzymes. Pretreatment with the acid hydrolyzes the hemicellulose, or a portion thereof, that is present in the lignocellulosic feedstock to the monomeric sugars xylose, arabinose, mannose and galactose. Preferably, the acid pretreatment is performed so that nearly complete hydrolysis of the hemicellulose and only a small amount of conversion of cellulose to glucose occurs. The cellulose is hydrolyzed to glucose in a subsequent step that uses cellulase enzymes. Typically a dilute acid, at a concentration from about 0.02% (w/w) to about 2% (w/w), or any amount between about 0.02% to about 2% (measured as the percentage weight of pure acid in the total weight of dry feedstock plus aqueous solution) is used for the pretreatment. Preferably, the acid pretreatment is carried out at a temperature of about 180° C. to about 250° C. for a time of about 6 seconds to about 600 seconds, at a pH of about 0.8 to about 2.0. The acid pretreatment may be carried out in a single stage or in more than a single stage, although it is preferably performed in a single stage.

One method of performing acid pretreatment of the feedstock is steam explosion using the process conditions set out, for example, in U.S. Pat. No. 4,461,648 (Foody). Another method of pretreating the feedstock slurry involves continuous pretreatment, i.e., the lignocellulosic feedstock is pumped through a reactor continuously. Continuous acid pretreatment is familiar to those skilled in the art; see, for example, U.S. Pat. No. 5,536,325 (Brink); WO 2006/128304 (Foody and Tolan); and U.S. Pat. No. 4,237,226 (Grethlein). Additional techniques known in the art may be used as required, such as, the process disclosed in U.S. Pat. No. 4,556,430 (Converse et al).

The aqueous phase of the pretreated feedstock may comprise sugars produced by the hydrolysis of hemicellulose, as well as the acid added during the pretreatment and any organic acids liberated during the pretreatment. When sulfuric acid is employed in pretreatment, the stream additionally contains sulfate salts resulting from the addition of sulfuric acid to the feedstock. The sulfate salts include calcium sulfate. The sulfate salts also include one or more sulfate salts of potassium, sodium, or ammonium. These sulfate salts include, but are not limited to, potassium sulfate, potassium bisulfate, sodium sulfate, and sodium bisulfate, As used herein, the term "sulfate salts" encompasses both sulfate and bisulfate salts, the relative concentration of which depends on the pH of a stream, as is well known in the art.

In a preferred embodiment, the sulfate salts include magnesium sulfate.

The sulfate salts of the monovalent cations, potassium, sodium and ammonium, and of the divalent cation magnesium are highly soluble in aqueous solution, whereas calcium sulfate is much less soluble.

The pretreatment may alternatively be conducted with alkali. In contrast to acid pretreatment, pretreatment with alkali may not fully hydrolyze the hemicellulose component of the feedstock. Rather, the alkali reacts with acidic groups present on the hemicellulose. The addition of alkali may also alter the crystal structure of the cellulose so that it is more amenable to hydrolysis. Examples of alkali that may be used in the pretreatment include ammonia, ammonium hydroxide, potassium hydroxide, and sodium hydroxide. The pretreatment is preferably not conducted with alkali, such as lime and magnesium hydroxide that is insoluble in water.

An example of a suitable alkali pretreatment is Ammonia Freeze Explosion, Ammonia Fiber Explosion or Ammonia Fiber Expansion ("AFEX" process). According to this process, the lignocellulosic feedstock is contacted with ammonia or ammonium hydroxide in a pressure vessel for a sufficient time to enable the ammonia or ammonium hydroxide to alter the crystal structure of the cellulose fibers. The pressure is then rapidly reduced, which allows the ammonia to flash or boil and explode the cellulose fiber structure. (See, for example, U.S. Pat. Nos. 5,171,592, 5,037,663, 4,600,590, 6,106,888, 4,356,196, 5,939,544, 6,176,176, 5,037,663 and 5,171,592.) The flashed ammonia may then be recovered according to known processes.

Another alkali pretreatment is with low ammonia concentrations (See, for example, US Patent Application Publication No. 2007/0031918 and US Patent Application Publication No. 2007/0037259).

If an alkali pretreatment is employed, the pretreated feedstock may be neutralized with sulfuric acid. Sulfuric acid will produce the sulfate salts present in the sugar stream.

The sugar solution obtained from the pretreated feedstock (known alternatively herein as the "sugar stream", "sugar stream comprising calcium sulfate" or "sugar hydrolyzate stream") is preferably substantially free of undissolved or suspended solids. This may be achieved by washing the pretreated feedstock with an aqueous solution to produce a wash stream comprising the sugar, the acid and other soluble components, and a solids stream comprising the remaining unhydrolyzed components of the feedstock. Alternatively, the pretreated feedstock may be subjected to filtration, centrifugation, or other known processes, as previously described, for separating fiber solids or suspended solids from an aqueous solution. Optionally, the aqueous sugar stream may then be concentrated, for example, by evaporation or with membranes, or the like. Any trace solids may be removed by microfiltration.

Alkali may be added to the sugar stream obtained from acid pretreatment prior to the calcium removal step in order to neutralize sulfuric acid present in the stream. Preferred alkalis includes ammonia or ammonium hydroxide, which result in the formation of ammonium sulfate by reaction with the sulfuric acid resulting from the pretreatment. The ammonium sulfate and other sulfate salts present in the neutralized sugar stream may be recovered as described herein. Other preferred alkalis are sodium hydroxide and potassium hydroxide which produce sodium sulfate and potassium sulfate, respectively.

Although the production of a sugar stream arising from the hydrolysis of the hemicellulose component of the feedstock has been described above, the stream may also comprise glucose arising from hydrolysis of the cellulose component of the feedstock. This may involve subjecting the pretreated feedstock to an enzymatic hydrolysis with cellulase enzymes as discussed below.

When cellulose hydrolysis using cellulase enzymes is carried out, the pH of the pretreated feedstock is typically adjusted with alkali to a pH that is amenable to the cellulase enzymes. This is typically carried out at a pH of about 4.5 to about 5.0. Following pH adjustment, the enzyme hydrolysis of the pretreated feedstock is conducted, for example, as described in WO 2005/099854 (Foody et al.) and pages 16-18 of WO 2006/063467 (Foody and Rahme). The fiber solids containing cellulose are optionally separated from the aqueous component of the pretreated feedstock, with the enzymatic hydrolysis then conducted on the separated solids. Alternatively, the cellulase hydrolysis is carried out on the entire hydrolyzate without separation of the fiber solids. After enzyme hydrolysis of the pretreated feedstock, any insoluble solids present in the sugar hydrolyzate stream are removed prior to the calcium removal step using conventional solid-liquid separation techniques.

The sulfate salts present in the sugar stream arising from cellulase hydrolysis will contain sulfate salts arising from the addition of sulfuric acid to the feedstock during acid pretreatment. Sulfuric acid will also be present in the sugar solution fed to the calcium removal step if the solution is not completely neutralized. Alternatively, the sugar stream is neutralized, or partially-neutralized, prior to being fed to the cation exchanger. If such a neutralization step is conducted with ammonia or ammonium hydroxide, the sugar stream will also contain ammonium sulfate. If such neutralization is carried out with sodium hydroxide or potassium hydroxide, the sugar stream will also contain sodium sulfate and potassium sulfate, respectively. These salts may then be recovered as described herein.

In a preferred embodiment, the sugar stream comprising calcium sulfate comprises magnesium sulfate.

Optionally, the sugar stream obtained from the pretreated feedstock is combined with the sugar stream from cellulose hydrolysis to produce a combined sugar stream comprising pentose and hexose sugars arising from hydrolysis of the hemicellulose and cellulose components of the feedstock, respectively.

It is also within the scope of the invention to produce a sugar stream by an acidic or alkali hydrolysis in which the temperature, acid concentration and duration of the hydrolysis are sufficient to hydrolyze the cellulose and hemicellulose to their monomeric constituents, which is glucose from cellulose and xylose, galactose, mannose and arabinose from hemicellulose. Examples of such processes are disclosed in U.S. Pat. Nos. 5,620,877 and 5,782,982 (Farone et al.). Furthermore, a two-stage acid hydrolysis process may be conducted, whereby the first stage involves solubilizing primarily the hemicellulose component of the feedstock, but little cellulose, and the second stage then completes hydrolysis of the cellulose to glucose. (See, for example, U.S. Pat. No. 5,221,357 (Brink)).

If alkali hydrolysis or alkali pretreatment is employed, the alkali hydrolyzed feedstock may be neutralized with sulfuric acid which produces the sulfate salts present in the sugar stream.

Many lignocellulosic feedstocks contain hemicellulose with acetyl groups attached to xylan which are liberated as acetic acid during acid pretreatment or acid hydrolysis. Thus, if the feedstock is hydrolyzed with acid, the sugar stream will typically comprise acetic acid. Additional organic acids that may be liberated during pretreatment or acid hydrolysis include galacturonic acid, formic acid, lactic acid, glucuronic acid or a combination thereof. The sugar stream may also contain other organic compounds, including but not limited to, furfural, hydroxymethyl furfural (HMF), dissolved lignin, and the like. The concentration of organic compounds may be from about 0% to about 85% of the total solutes present in the aqueous stream, or from about 50% to about 85% of the total solutes present in the aqueous sugar stream.

As used herein, the terms "calcium" and "$Ca^{2+}$" refer to calcium ions. As used herein, the terms "magnesium" and "$Mg^{2+}$" refer to magnesium ions. As used herein, the term "sulfate" refers to sulfate ions. As used herein, the term "chloride" refers to chloride ions. As used herein, the term "acetate" refers to acetate ions. As used herein, the terms "potassium" or "$K^+$" refer to potassium ions. As used herein, the terms "sodium" or "$Na^+$" refer to sodium ions. As used herein, the terms "ammonium" or "$NH_4^+$" refer to ammonium ions.

The concentration of sulfate in the sugar stream may be between about 1.0 g/L and about 50 g/L, or between about 5 and about 25 g/L, or any amount between about 1.0 g/L and about 50 g/L. For example, the sulfate concentration may be about 2.5, about 5, about 10, about 15, about 20, about 25, about 30, about 35, about 40, about 45 or about 50 g/L.

The process of the invention involves removing calcium from the sugar stream comprising calcium sulfate. In a preferred embodiment, this may be conducted by precipitation of the calcium, by cation exchange or by the use of a chelating resin. Without being limiting in any manner, the precipitation of calcium, in the form of calcium sulfate, from the sugar stream may be carried out by treating the stream with carbon dioxide to produce an insoluble calcium salt. The term "insoluble calcium salt" refers to a calcium salt with lower solubility than calcium sulfate. Calcium carbonate is one such salt. An example of a suitable source of carbon dioxide for producing calcium carbonate is ammonium carbonate, which produces calcium carbonate when added to calcium sulfate. In a preferred embodiment, the carbon dioxide is added together or in combination with potassium hydroxide, sodium hydroxide, ammonium hydroxide, ammonia, or combinations thereof. In another preferred embodiment, calcium is precipitated from the sugar stream by the addition of a carbonate salt. The term "carbonate salt" refers to both carbonate or bicarbonate salts, the relative proportions of each depending on the pH, as is well known in the prior art.

It should be understood that the present invention is not limited by the particular method of producing the insoluble calcium salt. The calcium salt can be precipitated by, for example, the addition of phosphate salts or phosphoric acid and an alkali. Alternately, the calcium can be precipitated by the addition of sulfite salts or sulfurous acid or sulfur dioxide and an alkali. In this context, the term "phosphate salts" denotes monophosphate, diphosphate, or triphosphate salts. The term "sulfite salts" denotes sulfite and bisulfite salts.

The insoluble calcium salt is then removed from the salt stream to produce a sugar stream comprising the remaining soluble potassium, ammonium and/or sodium sulfate salts. This is carried out by allowing the salts to precipitate and then separating the precipitate using known methods such as, for example, centrifugation, microfiltration, plate and frame filtration, crossflow filtration, pressure filtration, vacuum filtration, settling and the like. The sugar stream comprising the remaining sulfate salts may then be fed to an ion exchange resin bed, preferably a cation exchange resin bed which binds the cations of the remaining monovalent sulfate salts and produces a de-ionized sugar stream. The cation exchange resin bed is then regenerated with sulfuric acid to obtain the sulfate salts of the monovalent cations.

In a preferred embodiment, the sugar stream containing calcium sulfate also contains magnesium sulfate. In this embodiment, the precipitation of calcium carbonate is accompanied by the precipitation of magnesium carbonate, and both compounds are removed from the sugar stream.

When cation exchange or a chelating resin are employed to remove calcium from the sugar stream comprising calcium sulfate, the resin bed is regenerated with a regenerant that reacts with the bound calcium to produce a calcium salt that has greater solubility in water than calcium sulfate. The use of cation exchange and chelating resin beds in the practice of the invention is described in more detail below.

By the phrase "a sugar stream containing substantially no calcium ions", is meant that, in the stream being referred to, calcium comprises less than about 3% of the total weight of cations, including calcium, sodium, potassium, ammonium, magnesium, and hydrogen ($H^+$). This is a sufficiently low concentration of calcium ions to avoid precipitation in a cation exchange resin bed system regenerated with sulfuric acid. For example, the stream may comprise less than about 3%, about 2% about 1.5%, about 1%, or about 0.5% of the cations as calcium.

As noted above, the sugar stream comprising calcium sulfate may be fed to a cation exchange resin to remove calcium and produce soluble salts. If the resin bed comprises a cation exchange resin, it will typically be strongly acidic. By a strong acid cation exchange resin, it is meant a resin with a polymeric structure comprising a strong acid functional group. A common strong acid functional group found in strong acid cation exchange resins is a sulfonate group.

As will be appreciated by those of skill in the art, cation exchange resins can vary depending on the nature of the polymeric structure, supplier, lots, synthesis methods, process parameters, or functional groups. This results in resins that differ in certain parameters such as, for example, pressure drop, swelling and shrinking, moisture holding capacity, diameter, porosity, thermal stability and physical stability. The resins may be either macroporous, i.e., contain discrete pores, or microporous (gel resins) and can contain a narrow or wide range of particle shape and size. Furthermore, the cross-linking of the polymeric structure can be varied to achieve a desired degree of porosity. A common polymeric structure for a strong acid resin is formed using divinyl benzene cross-linked polystyrene.

When the sugar stream comprising calcium sulfate is fed to a cation exchanger, the resin becomes loaded with cations of the sulfate salts by exchange with cations on the resin, while a stream comprising sugar, along with other uncharged compounds, such as inorganic and organic acids elute as a low-affinity stream. This stream is a sugar stream containing substantially no calcium ions. This stream may be produced, for example, by feeding the sugar stream to a cation exchange resin bed in the $H^+$ form as described herein, although it should be appreciated that other cationic forms of cation exchange resin beds may be utilized. Cation exchange resins typically bind both monovalent (e.g., sodium, potassium and ammonium ions) and divalent cations (calcium and magnesium ions). For this discussion, let us assume that the sugar stream comprising calcium sulfate contains potassium, sodium, ammonium, and magnesium cations. The affinity of the cations in most cation exchange resin systems follows the order of ammonium and sodium having the lowest binding affinity, and eluting first from the resin bed, followed by potassium, magnesium, and calcium with the highest affinity. The resin is regenerated after a certain volume of the sugar stream comprising calcium sulfate has been fed. The choice of volume to feed may be the point at which sodium, potassium or ammonium is about to elute from the bed. In this case, the sugar stream containing substantially no calcium ions contains very little, if any, sodium, ammonium, potassium, or magnesium ions. Alternatively, the feed can be stopped when magnesium is about to elute from the bed. In this case, the sugar stream containing substantially no calcium ions contains some sodium, ammonium, or potassium, but very little magnesium ions. A further alternative is to continue feed until calcium is about to elute from the bed. In this case, the sugar stream containing substantially no calcium ions will contain some potassium, ammonium, sodium, and magnesium.

Any regenerant that converts the calcium bound to the cation exchange resin to soluble calcium salts may be utilized. Non-limiting examples of processes employing cation exchangers to bind cations of the sulfate salts present in the sugar stream comprising calcium sulfate are provided hereinafter in FIGS. 1 and 2 and are described in Examples 6 and 7.

In one embodiment of the invention, the regeneration is carried out by the addition of acid to the cation exchange resin. In this case, the anion of the acid reacts with the adsorbed cation(s) on the resin to produce soluble salts. Preferably, the acid is hydrochloric acid, which produces soluble calcium chloride upon regeneration, as well as the chloride salts of other cations bound to the resin. A further non-limiting example of a suitable regenerant is a chloride salt, such as, for example, sodium chloride, potassium chloride or ammonium chloride, or a combination thereof. The use of sulfuric acid as a regenerant is avoided as this acid produces insoluble calcium sulfate salt that can precipitate within the resin bed. An example of a process employing hydrochloric acid as a regenerant is provided in FIG. 1, hereinafter. An example of a process employing a combination of chloride salts as a regenerant is provided in FIG. 2, hereinafter.

The concentration of hydrochloric acid used to regenerate the cation exchange resin bed may be about 5% to about 20%, or any concentration range therebetween. If the regenerant concentration is less than about 5%, then excess water will be present, and regeneration times will likely be too long for practical consideration. However, if the HCl concentration is too high, there is the risk of osmotic shock to the resin when water is added back to the system. This is more of a consideration for conventional beads than for smaller beads, which are more resistant to this shock. Thus, for conventional resin bead sizes, the regenerant concentration is preferably about 5% to about 8%, or any concentration range between about 5% and about 8%.

The cation(s) adsorbed on the cation exchange resin will be calcium, and also probably magnesium, and possibly potassium, ammonium, and sodium, depending on whether these cations are present in the feed to cation exchange and depending on the choice of point at which to stop feeding and start regeneration. If hydrochloric acid is the regenerant, a salt stream will be produced comprising calcium chloride and one or more of magnesium chloride, potassium chloride, sodium chloride, and ammonium chloride, depending on the presence of the relevant cations, along with any excess hydrochloric acid. Unlike calcium sulfate, calcium chloride is a highly soluble salt and thus does not precipitate in the resin bed.

Alternatively, the cation exchange resin bed may be regenerated with a salt, or a mixture of salts. For example, the cation exchanger may be regenerated with potassium, sodium, or ammonium salts or with a mixture. An example of a process employing regeneration of a cation exchange resin bed with potassium and ammonium salts, which is not to be considered limiting, is shown in FIG. 2 hereinafter. An example of a process employing regeneration of a cation exchange resin bed with ammonium salts is found in examples 6 and 7. Although the use of $K^+/NH_4^+$ salts are described, it should be understood that other salts, or mixtures of salts, may be employed as desired to regenerate the resin bed.

When KCl and $NH_4Cl$ are used to regenerate the cation exchange resin bed, the concentration of these salts may be between about 3% and about 15%, or any concentration range between about 3% and about 15%.

As will be appreciated by those of skill in the art, the operating conditions of the cation exchange operation may be adjusted as desired. For example, the temperature at which the cation exchange is conducted may range from ambient temperature to about 90° C. Elevated temperatures may be achieved by placing a heating jacket around the separation unit and monitoring the temperature with a thermocouple. The average flow rate of the feed may be between about 0.5 and about 20 L of feed/L resin/hr, or any value between about 0.5.

Although the use of cation exchangers has been described to bind cations present in the sugar stream comprising calcium sulfate, the sugar stream may alternatively be fed to a resin bed comprising a chelating functional group. Non-limiting examples of these are shown in hereinafter in FIGS. 3 and 4. In this case, calcium, and magnesium ions (if present), are selectively removed from the sugar solution by complexing with the chelating groups on the resin. Such resins are well known in the art and are typically used in water purification processes to remove metal contaminants from solution. According to this embodiment, as the sugar stream is passed through the resin bed, divalent cations are removed from the sugar stream, while salts of the monovalent cations, namely potassium sulfate, sodium sulfate and/or ammonium sulfate, pass through the resin bed along with the sugar. The resin is then regenerated with a suitable regenerant to displace the bound cations and produce a salt stream comprising a soluble calcium salt. An example of a preferred regenerant for this purpose is an acid, such as hydrochloric acid, which forms the soluble salt calcium chloride. Other acid regenerants may be utilized as desired to produce other soluble calcium salts.

As used herein, the term "chelating resin" refers to a resin into which functional groups have been introduced that form chelates with calcium ions, and optionally magnesium ions if such ions present in solution. The chelating group may be any group with two or more electron donor elements such as, for example, N, S, O and P. Various types of chelating resins are known in the art, including those with functional groups selected from N—O, S—N, N—N, O—O and P—N. Non-limiting examples of particularly well-known chelating resins that may be used in the practice of the invention include iminodiacetate-type and polyamine-type chelating resins.

As will be appreciated by those of skill in the art, similar to ion exchange resins, chelating resins may be either macroporous, i.e., contain discrete pores, or microporous (gel resins) and can contain a narrow or wide range of particle shape and size. Furthermore, the cross-linking of the polymeric structure can be varied to achieve a desired degree of porosity. A typical polymeric structure for a chelating resin is formed using divinyl benzene cross-linked polystyrene.

According to any of the aforementioned embodiments of the present invention, the regenerant can be fed to the resin bed in the same direction as the aqueous feed, which is known as "co-current regeneration". Alternatively, the regenerant may be counter-current, meaning that the regenerant feed is in the opposite direction to the aqueous feed. Following regeneration, the column(s) are optionally rinsed with water or other aqueous streams prior to resuming feed of the aqueous stream.

The resin bed used in any of the previously-described embodiments may be an elongate vertical column filled with the resin. Alternatively, a short column with a small height-to-diameter ratio may be employed. Such resins are utilized in RECOFLO® ion exchangers that are commercially available from Eco-Tec. As would be apparent to one of skill in the art, the volume of the resin bed is typically chosen based on the flow rate and the concentration of salts and acid in the sugar stream. The sizing of resin beds may be carried out by combining the data from laboratory, or other experiments, on the sugar solution with design principles that are familiar to those skilled in the art.

The chelating resin bed or cation exchange resin bed may include a single column or multiple columns. If multiple columns are employed, they may be arranged in parallel and/or in series. The total resin bed volume is typically about 3.0 to about 400 $m^3$.

The cation exchange operation or the chelation may be carried out using a Simulated Moving Bed (SMB) system. By the term "SMB system", it is meant any continuous chromatographic technique which simulates a flow of a liquid mobile phase moving countercurrent to a flow of a solid stationary phase, i.e., the SMB system simulates movement of the resin bed in a direction opposite to that of the liquid flow. Typically, an SMB system comprises multiple resin beds connected in a closed circuit with two or more inlet and two or more outlet streams. The simulated movement may be carried out by periodically shifting four or more flow locations by some fraction of the total bed. A description of the operation of an SMB system is provided in WO 2006/007691 (Foody and Tolan), to which the reader is directed for reference. Improved SMB ("ISMB") systems (available for example from Eurodia Industrie S.A., Wissous, France; Applexion S.A., Epone, France; or Amalgamated Research Inc., Twin Falls, Id.) may also be used in the practice of aspects of the invention.

Following regeneration, the resin bed is optionally rinsed with water or other aqueous streams prior to resuming feed of the aqueous sugar stream. Rinsing may also be carried out following feed of the aqueous sugar stream to the resin bed and prior to regeneration. In either case, the rinsing step is preferably conducted by applying about 0.5 to about 2.0 resin bed volumes of water to the resin bed.

The calcium in the salt stream obtained upon regeneration of the resin bed may next be removed by precipitation, to produce a clarified salt stream. This may involve the conversion of the soluble calcium salts to their corresponding insoluble salts by the addition of carbon dioxide. Preferably, the precipitation is conducted by the addition of carbon dioxide with alkali. Examples of suitable alkali include ammonium hydroxide, potassium hydroxide, sodium hydroxide, and ammonia alone or in combination with carbon dioxide. When a combination of alkali and carbon dioxide are used, they may be added separately to the salt stream, or may be combined to make a carbonate salt which is then added to the salt stream. Alternately, a carbonate salt from another source may be used. As used herein, the term "carbonate salt" is intended to include both carbonate salts and bicarbonate salt, the relative proportion of which depends on the pH, as is well known in the art. It is also contemplated that precipitation of these divalent cations (i.e., $Ca^{2+}$ and/or $Mg^{2+}$, if present) may be carried out with the addition of a flocculating agent or a chelator. Furthermore, it will be understood by those of skill in the art that any magnesium present in the salt stream may be removed by this precipitation step as well. It will also be understood by those skilled in the art that calcium carbonate and magnesium carbonate have a minimum solubility in water of about 0.05 g/L depending on the pH, temperature and ions present. At a minimum, this low concentration of calcium carbonate and magnesium carbonate will remain in solution after the precipitated salts are removed.

It should be understood that the present invention is not limited by the particular method of producing the insoluble calcium salt. The calcium salt can be precipitated by, for example, the addition of phosphate salts or phosphoric acid and an alkali. Alternately, the calcium can be precipitated by the addition of sulfite salts or sulfurous acid or sulfur dioxide and an alkali. In this context, the term "phosphate salts" denotes monophosphate, diphosphate, or triphosphate salts. The term "sulfite salts" denotes sulfite and bisulfite salts.

The insoluble calcium and/or magnesium salts are then removed from the salt stream to produce a stream referred to herein as a "clarified salt stream" comprising the remaining soluble potassium, ammonium and/or sodium salts. This is carried out by allowing the salts to precipitate and then separating the precipitate using known methods such as, for example, centrifugation, microfiltration, plate and frame filtration, crossflow filtration, pressure filtration, vacuum filtration, settling and the like.

The precipitation may be carried out at a temperature of between about 20° C. and about 90° C., or any temperature range between about 20° C. and about 90° C. A preferred temperature range is between about 40° C. and about 60° C., or any temperature range between about 40° C. and about 60° C. The amount of time that these conditions should be maintained to allow the insoluble calcium precipitates to form may be as long as 24 hours. However, in a preferred embodiment, the precipitation is carried out for about 5 to about 60 minutes, or any time range between about 5 to about 60 minutes, most preferably between about 10 and about 30 minutes, or any time range between about 10 to about 30 minutes. The solids concentration during the precipitation step may be between about 3% to about 15%, or any value between about 3% and about 15%. The precipitation process preferably removes more than 70% of the calcium from the regenerated salt stream. For example, the precipitation process removes more than 80%, more than 90%, or more than 95% of the calcium in the regenerated salt stream.

In an embodiment wherein the clarified salt stream is fed directly to a cation exchange system regenerated with sulfuric acid, then in the clarified salt stream calcium comprises less than about 3% of the total weight of cations, including calcium, sodium, potassium, ammonium, magnesium, and hydrogen ($H^+$). For example, the clarified salt stream may comprise less than about 3%, about 2% about 1.5%, about 1%, or about 0.5% of the cations as calcium.

After removal of the insoluble calcium precipitate, the salts of the monovalent cations remaining in the clarified salt stream may be converted to their sulfate salts as described in further detail below. (See, for example, FIG. 1 hereinafter).

Salts in the clarified salt stream may alternatively be used for regeneration of the first resin bed. Such an embodiment, which is not meant to be limiting in any manner, is depicted in FIG. 2 and described in Examples 6 and 7 hereinafter. This is particularly advantageous if the salts contain K+ and $NH_4$+. Preferably, the clarified salt stream is evaporated prior to its use as a regenerant. The calcium carbonate or magnesium carbonate can precipitate during evaporation, in which case the evaporator vessel must be cleaned periodically.

Ion exchange using sulfuric acid as a regenerant is conducted to obtain the product stream comprising sulfate salts of the monovalent cations as follows. As noted above, the feed to this ion exchange operation may be the clarified salt stream containing one or more salts of monovalent cations (See, for example, FIG. 1 hereinafter). Alternatively, it may be the sugar stream containing substantially no calcium ions obtained from the first cation exchanger or the chelating resin bed (See, for example, FIGS. 2, 3, and 4 hereinafter). According to another embodiment of the invention, the stream fed to this ion exchanger is the sugar stream comprising calcium sulfate that has been treated to precipitate and remove calcium, as described above. In each case, the stream fed to the ion exchanger to produce the sulfate salts of the monovalent cations contains substantially no calcium. The feed stream can also have magnesium present as $MgSO_4$.

Preferably, the ion exchange used to produce the sulfate salt(s) is a cation exchanger. Alternatively, anion exchange may be employed to obtain the product stream comprising sulfate salts, for example as described by U.S. Pat. No. 4,707,347 (Vajne).

When a cation exchange resin bed is employed to obtain the sulfate salts, the resin bed is typically fed until it is saturated with cations of the soluble salts present in the clarified salt stream; the breakthrough of the cations is typically imminent when the feed is stopped. The cations bind to the resin and exchange with $H^+$ on the resin. Compounds with low affinity for the resin, such as sugars and organic and inorganic acids, pass through the resin bed. When feed is stopped, the resin is then regenerated with sulfuric acid, which reacts with the cations adsorbed on the resin to produce a salt stream comprising sulfate salts. As in the first cation exchanger or chelating resin bed, the regenerant can be fed co-currently or counter-currently to the direction of the clarified salt stream feed. The exchange resin is typically a strong acid cation exchange resin. By a "strong acid cation exchange resin", it is meant a resin with a polymeric structure comprising a strong acid functional group. A common strong acid functional group found in strong acid cation exchange resins is a sulfonate group, although other groups may be employed as desired.

Similar to the first cation exchange or chelating resin operation, the cation exchanger used to produce the sulfate salts may be an elongate vertical column filled with resin or a short column with a small height-to-diameter ratio. The cation exchange operation may comprise multiple beds which are arranged in parallel and/or in series. The volume of the resin bed is typically chosen based on the flow rate and the concentration of salts and acid in the sugar stream. Furthermore, the sizing of resin beds may be carried out by combining the data from experiments on the aqueous sugar stream with design principles that are familiar to those skilled in the art. The cation exchange operation may be an SMB or an ISMB operation as described above. Following regeneration of the resin bed, it is optionally rinsed with water or other aqueous streams prior to resuming feed of the aqueous sugar stream. Rinsing may also be carried out following feed of the aqueous sugar stream and prior to regeneration. This is preferably conducted by applying about 0.5 to about 2.0 resin bed volumes of water to the resin bed.

The product stream obtained upon regeneration of the ion exchanger will comprise ammonium sulfate, potassium sulfate, and/or sodium sulfate, but will be substantially free of calcium sulfate salt since this cation is not substantially present in the solution fed to the ion exchange. Thus, the precipitation of calcium sulfate salt is avoided in the resin bed.

When an acid regenerant is used to convert the sulfate salts to their corresponding soluble salts, the resin bed of the cation exchanger may be regenerated with any excess acid in the regenerated streams. In one embodiment of the invention, excess acid present in the regenerated stream from the first cation exchanger is re-used to regenerate this resin bed. (See, for example, FIG. 1 hereinafter). In this case, the acid is recovered from other compounds present in the stream. In a further embodiment of the invention, the stream comprising acid from the second ion exchanger is fed back to the first cation exchanger. According to this latter embodiment, this stream will contain primarily acid and thus acid purification is not necessary.

Examples of methods that may be employed to recover the excess acid are distillation and acid retardation. Acid retardation is a particularly preferred method for recovering acids and employs strongly basic anion exchange resins to bind or adsorb mineral acid. Organic acids, salts and other compounds which have low affinity for the resin pass through the bed, while the adsorbed acid elutes later after addition of a regenerant, which is typically water. Acid retardation is known and is described in Hatch and Dillon (Industrial & Engineering Chemistry Process Design and Development, 1963, 2(4):253-263) and Anderson et al. (Industrial and Engineering Chemistry, 1955, 47(8):1620-1624). Evaporation or distillation can be utilized when the acids to be recovered have a high volatility, such as, for example, HCl.

DETAILED DESCRIPTION OF FIG. 1

Figure 1:
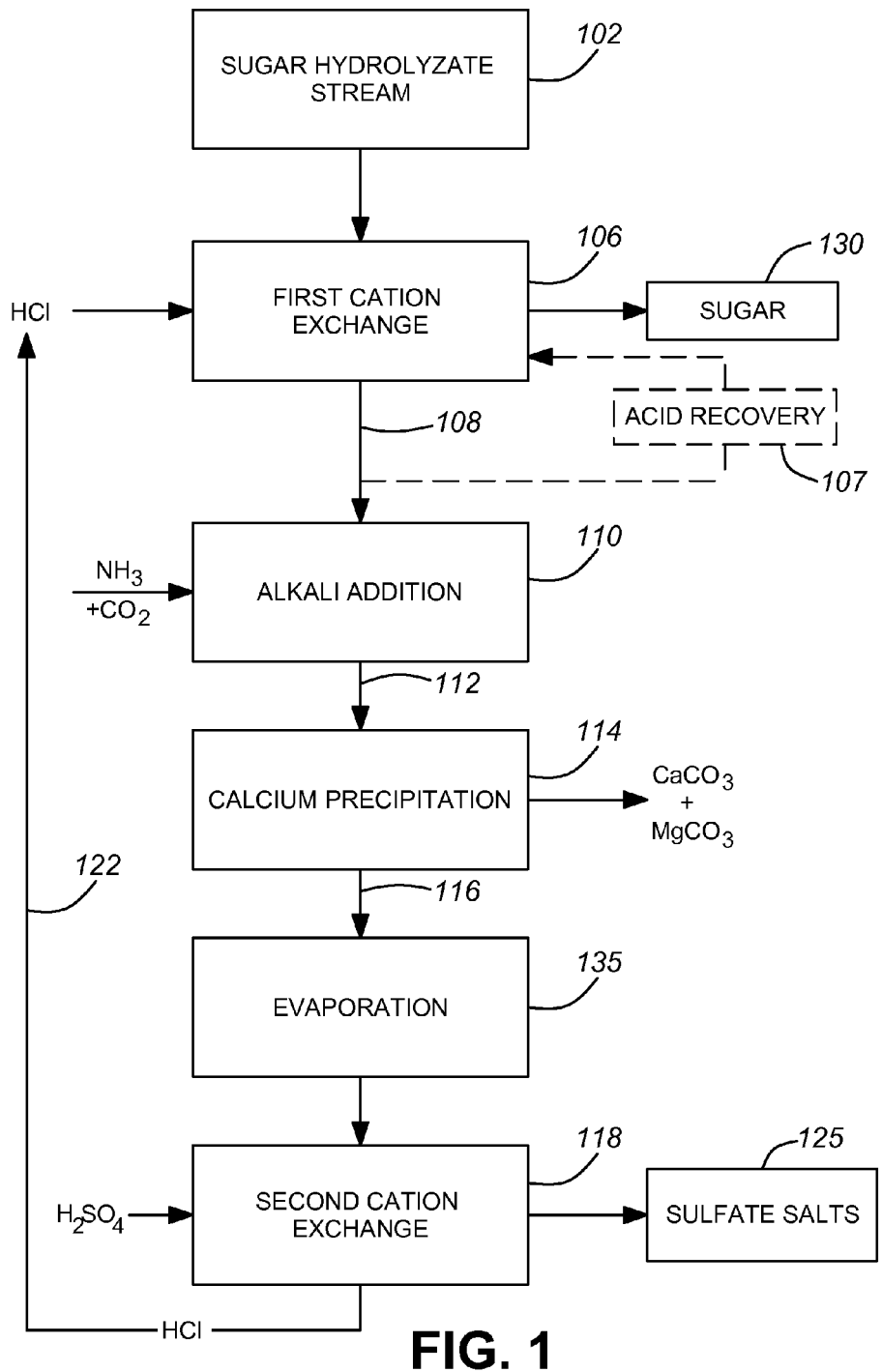
FIG. 1 is a process flow diagram for recovering sulfates salts from a sugar stream obtained from the hydrolysis of a lignocellulosic feedstock according to an embodiment of the invention.

Referring now to various embodiments of aspects of the present invention FIG. 1 of the drawings shows a process flow diagram for recovering sulfate salts from a sugar hydrolyzate stream obtained from the hydrolysis of a lignocellulosic feedstock. The sugar hydrolyzate stream 102 is produced by washing a pretreated lignocellulosic feedstock with water to obtain a stream comprising the sugars, i.e., xylose, arabinose, mannose and galactose, as well as sulfate salts of potassium, sodium, magnesium and calcium. As discussed previously, these sulfate salts arise from the reaction of cations present in the feedstock with sulfuric acid added during the pretreatment.

The sugar hydrolyzate stream 102 is fed to a first cation exchanger 106 in the $H^+$ form to convert the sulfate salts to their corresponding chloride salts. As the hydrolyzate stream 102 is fed to the first cation exchanger 106, cations of the sulfate salts, namely potassium, sodium, calcium and magnesium, replace $H^+$ on the resin, while sugars and other uncharged compounds pass through the resin bed 106. This produces a sugar stream containing substantially no calcium or magnesium, as well as substantially no potassium and sodium ions. After cations start to elute from the resin bed, feed is stopped and the bed is washed with water. The bed is regenerated back to the $H^+$ form by the addition of hydrochloric acid 122. This produces a salt stream 108 comprising the soluble salts calcium chloride, magnesium chloride, potassium chloride and sodium chloride resulting from the reaction of adsorbed cations with chloride ions, as well as excess hydrochloric acid. In contrast to calcium sulfate, the calcium chloride resulting from the regeneration is soluble in water and thus does not precipitate within the resin bed. The excess hydrochloric acid may be recovered by acid recovery unit 107 and then recycled back to the first cation exchanger 106 for use as a regenerant. The stream 130 comprising sugar and other compounds with low affinity for the resin may be further processed to remove acids and then be subjected to fermentation to produce ethanol or other fermentation products.

A clarified salt stream 116 is then obtained from salt stream 108 by treating salt stream 108 with carbon dioxide and ammonia in a calcium and magnesium precipitation step 110 to produce stream 112 containing insoluble calcium and magnesium carbonates. Alternatively ammonium carbonate may be added to salt stream 108 to produce calcium carbonate. Calcium carbonate and magnesium carbonate are then removed from the salt stream by filtration at 114, or by other solid-liquid separation techniques, including, but not limited to centrifugation, microfiltration, plate and frame filtration, crossflow filtration pressure filtration, vacuum filtration and settling, to produce the clarified salt stream 116. The clarified salt stream contains chloride and carbonate salts of ammonium, potassium, and sodium and a low concentration of calcium and magnesium carbonate that is near the solubility limit.

The amount of liquid in the clarified salt stream 116 resulting from the filtration 114 is reduced by partial evaporation at 135 and that concentrated stream is subsequently fed to second cation exchanger 118 which contains resin in the $H^+$ form. As the salt stream is fed to the second cation exchanger 118, the cations displace $H^+$ on the resin bed to obtain sulfate salts of the monovalent cations, i.e., potassium, sodium, and ammonium.

The amount of liquid in the clarified salt stream 116 resulting from the filtration 114 is reduced by partial evaporation at 135 and that concentrated stream is subsequently fed to second cation exchanger 118 which contains resin in the $H^+$ form. As the salt stream is fed to the second cation exchanger 118, the cations displace $H^+$ on the resin bed to obtain sulfate salts of the monovalent cations, i.e., potassium, sodium, and ammonium.

Hydrochloric acid formed from the chloride salts and the $H^+$ exits the resin bed in stream 122. The cation exchange resin bed 118 is regenerated with sulfuric acid, which converts the resin back to the $H^+$ form and produces a sulfate salt product stream 125 comprising potassium sulfate, sodium sulfate, ammonium sulfate, and a small amount of calcium sulfate and magnesium sulfate. If the sugar hydrolyzate stream 102 is neutralized with ammonia or ammonium hydroxide prior to being subjected to the cation exchange, the salt stream 125 will thus contain a higher concentration of ammonium sulfate.

As shown, the hydrochloric acid which elutes in the stream 122 is recycled back to the first cation exchanger 106 to regenerate the resin bed.

DETAILED DESCRIPTION OF FIG. 2

Figure 2:
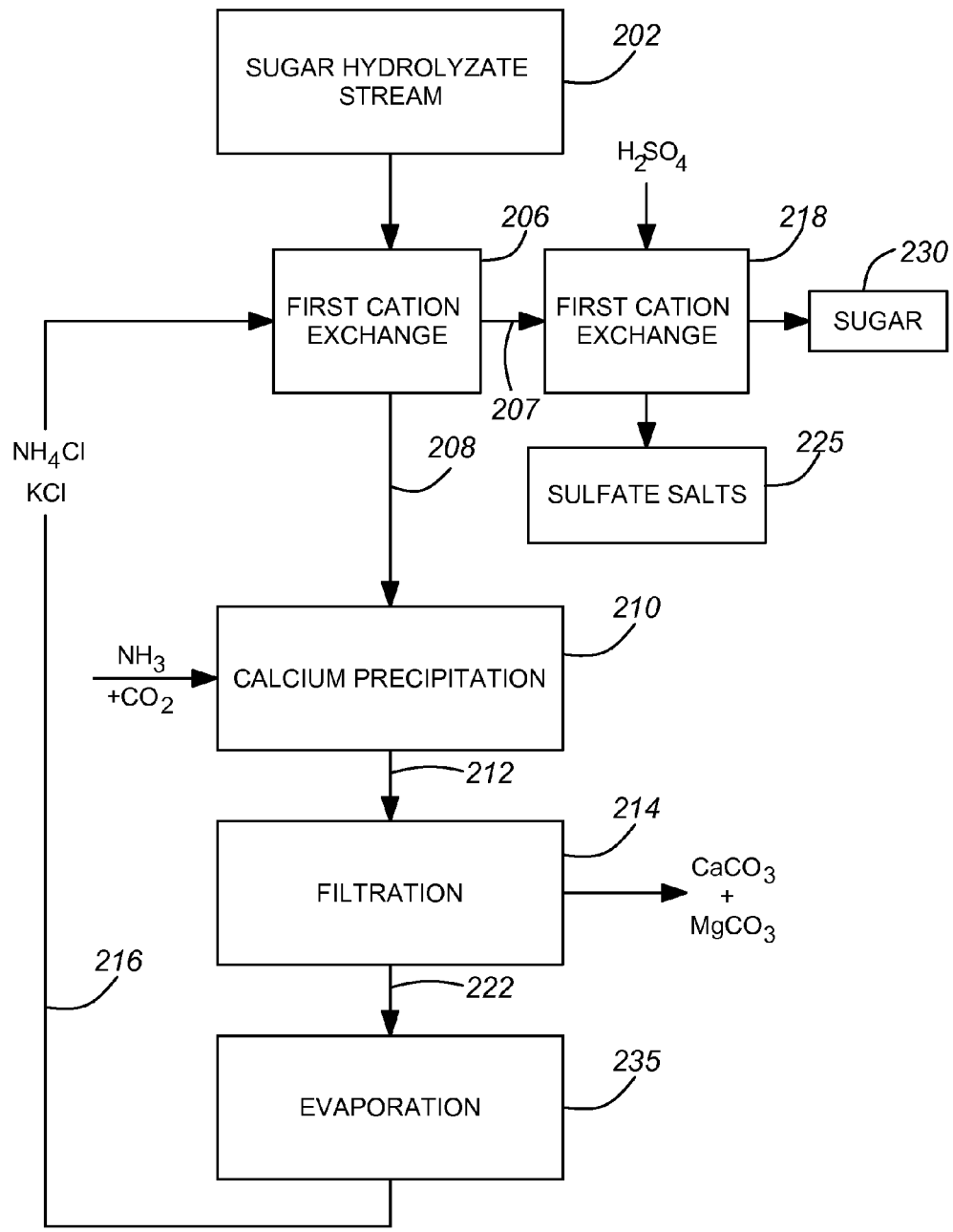
FIG. 2 is a process flow diagram for recovering sulfate salts from a sugar stream obtained from the hydrolysis of a lignocellulosic feedstock according to another embodiment of the invention.

Referring now to various embodiments of aspects of the present invention, FIG. 2 of the drawings shows an alternative embodiment of the invention As shown in FIG. 2, a sugar hydrolyzate stream 202 comprising potassium sulfate, ammonium sulfate, calcium sulfate and magnesium sulfate is fed to a first cation exchanger 206 having a resin bed saturated with potassium and ammonium ions. In this embodiment a sugar stream comprising substantially no calcium ions 207 comprising sugar, potassium sulfate, and ammonium sulfate is obtained from the cation exchanger 206. The resin in first cation exchanger 206 initially binds all of the cations as they are capable of exchanging with potassium and ammonium ions present on the resin. However, calcium and magnesium have a higher affinity for the resin than potassium, ammonium, and sodium, and thereby the resin bed becomes enriched in the divalent cations.

Referring now to various embodiments of aspects of the present invention, FIG. 2 of the drawings shows an alternative embodiment of the invention. As shown in FIG. 2, a sugar hydrolyzate stream 202 comprising potassium sulfate, ammonium sulfate, calcium sulfate and magnesium sulfate is fed to a first cation exchanger 206 having a resin bed saturated with potassium and ammonium ions. In this embodiment, a sugar stream comprising substantially no calcium ions 207 comprising sugar, potassium sulfate, and ammonium sulfate is obtained from the cation exchanger 206. The resin in first cation exchanger 206 initially binds all of the cations as they are capable of exchanging with potassium and ammonium ions present on the resin. However, calcium and magnesium have a higher affinity for the resin than potassium, ammonium, and sodium, and thereby the resin bed becomes enriched in the divalent cations.

As the resin bed of the first cation exchanger 206 starts to elute calcium, feed is stopped and the bed is washed with water. The resin in first cation exchanger 206 is regenerated by the addition of ammonium chloride and potassium chloride salts in regenerated stream 216. This produces a regenerated stream 208 comprising the soluble salts calcium chloride, magnesium chloride, ammonium chloride, and potassium chloride, and converts the resin back to the $NH_4^+$/$K^+$ form. The regenerated stream 208 is then treated with ammonia and carbon dioxide in a calcium and magnesium precipitation step 210, as described previously, to precipitate calcium carbonate and magnesium carbonate, which are then removed from solution by filtration at 214, or by any other solid/liquid separation technique as described hereinabove. Alternatively, other alkalis may be used to precipitate calcium and magnesium salts. The clarified salt stream 222 contains potassium and ammonium chloride and carbonate salts, and a low concentration of calcium carbonate and magnesium carbonate that is below the solubility limit of these salts. The amount of liquid in clarified salt stream 222 is reduced by partial evaporation at 235 and the concentrated stream is then recycled to the first cation exchanger 206 to regenerate the resin bed.

The sugar stream containing substantially no calcium ions 207 obtained from the first cation exchanger 206 contains substantially no calcium and comprises sugar, and potassium sulfate, sodium sulfate, magnesium sulfate, and ammonium sulfate. Sugar stream 207 is fed to a second cation exchanger 218 to obtain sulfate salts of the monovalent cations, i.e., potassium, sodium, and ammonium, and the divalent cation magnesium. As this stream 207 is fed to the second cation exchanger 218, the potassium, sodium, magnesium, and ammonium ions of the sulfate salts bind to the resin, while sugar and acid in stream 230 pass through the resin bed. The second cation exchanger 218 is then regenerated with sulfuric acid to obtain the product stream comprising ammonium and potassium sulfate, sodium sulfate and magnesium sulfate 225.

Thus it is seen that, in this embodiment, a stream comprising potassium chloride and ammonium chloride remaining in solution after precipitation of calcium and magnesium salts is recycled to the first cation exchanger to regenerate the resin bed.

DETAILED DESCRIPTION OF FIG. 3

Figure 3:
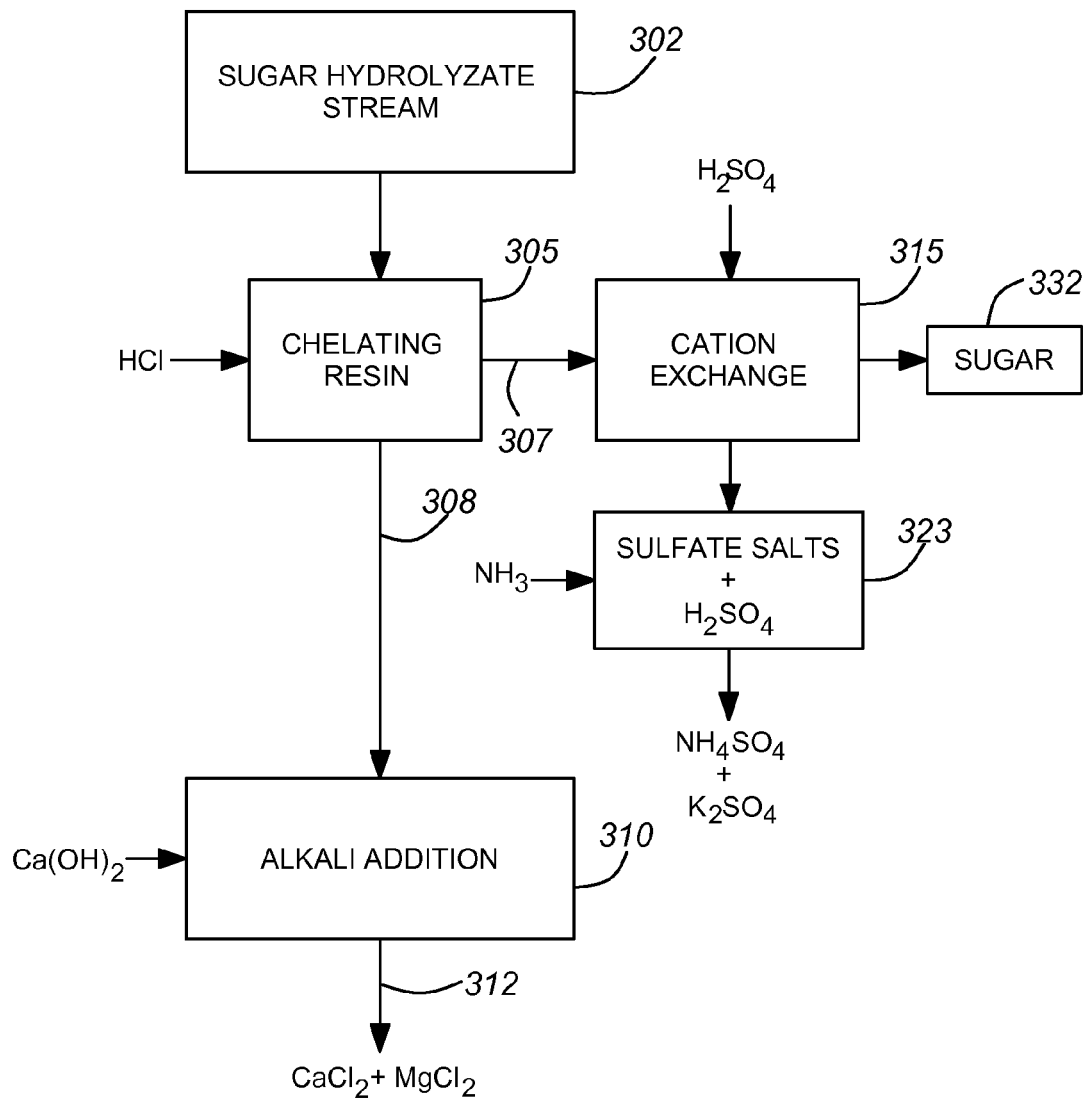
FIG. 3 is a process flow diagram for recovering sulfate salts from a sugar stream obtained from the hydrolysis of a lignocellulosic feedstock according to yet another embodiment of the invention.

Referring now to various embodiments of aspects of the present invention, FIG. 3 of the drawings shows another embodiment of the present invention. As seen in FIG. 3, the sugar hydrolyzate stream 302 comprising potassium sulfate, sodium sulfate, ammonium sulfate, calcium sulfate and magnesium sulfate is fed to an ion exchange resin bed 305 comprising a chelating functional group for complexing with calcium and magnesium ions. A sugar stream 307 containing substantially no calcium ions and substantially no magnesium ions, but comprising sugar, potassium sulfate, sodium sulfate and ammonium sulfate is obtained from the resin bed of the chelating resin ion exchanger 305.

After the bed of the chelating resin in the chelating resin ion exchanger 305 is saturated with calcium and magnesium ions, it is regenerated by the addition of hydrochloric acid. This results in a regenerated stream 308 comprising the soluble salts calcium chloride and magnesium chloride, and excess hydrochloric acid. Regenerated stream 308 is then treated with calcium hydroxide in an alkali addition step 310 to convert the excess hydrochloric acid to calcium chloride. This produces a salt product stream 312 comprising calcium chloride and magnesium chloride salts, which may be used, for example, as road salts.

The sugar stream 307 containing substantially no calcium ions obtained from the chelating resin bed 305 comprising sugar, salts of monovalent cations, namely, potassium sulfate, sodium sulfate and ammonium sulfate but substantially no calcium or magnesium is fed to a cation exchanger 315. As this sugar stream 307 is fed to the cation exchanger 315, the potassium, sodium and ammonium ions bind to the cation exchange resin therein, while sugar and acid as stream 332 pass through the cation exchange resin bed. The cation exchanger 315 is then regenerated with sulfuric acid to obtain the product stream 323 comprising potassium, sodium and ammonium salts along with excess sulfuric acid. As shown, aqueous ammonia is added to the sulfate salts 323 to convert the remaining sulfuric acid to ammonium sulfate. The result is a stream comprising potassium sulfate, sodium sulfate and ammonium sulfate.

Thus, this embodiment of the invention utilizes a chelating resin to bind calcium and magnesium ions.

DETAILED DESCRIPTION OF FIG. 4

Figure 4A:
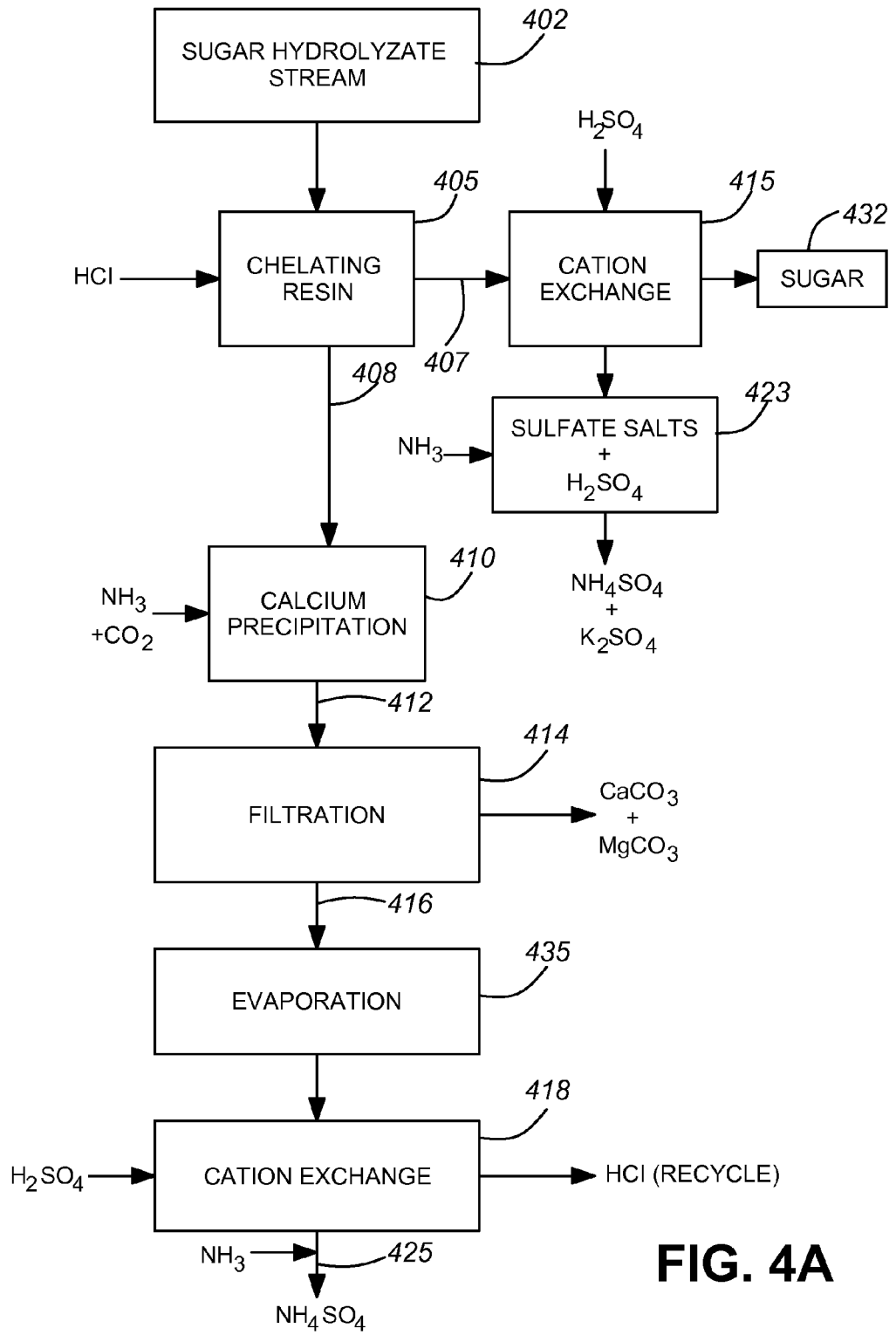
FIG. 4A is a process flow diagram for recovering sulfates salts from a sugar stream obtained from the hydrolysis of a lignocellulosic feedstock according to another embodiment of the invention.
Figure 4B:
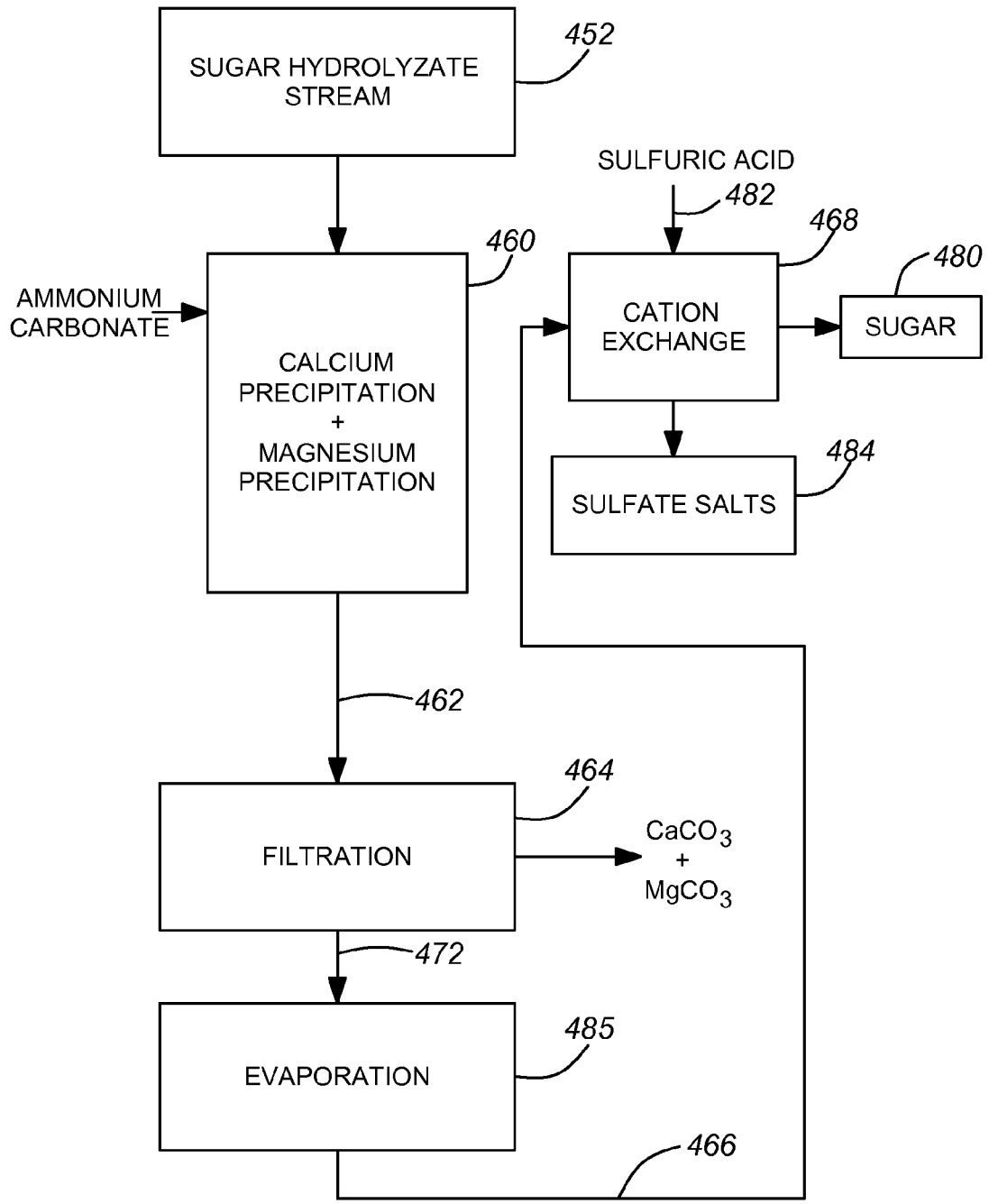
FIG. 4 is a process flow diagram for recovering sulfate salts from a sugar stream obtained from the hydrolysis of a lignocellulosic feedstock according to one embodiment of the invention.

Referring now to various embodiments of aspects of the present invention, FIG. 4 of the drawings shows another embodiment of the present invention depicts a variation of the process of FIG. 3.

As seen in FIG. 4A, the sugar hydrolyzate stream 402 comprising potassium sulfate, sodium sulfate, ammonium sulfate, calcium sulfate and magnesium sulfate is fed to an ion exchange resin bed 405 comprising a chelating functional group for complexing with calcium and magnesium ions. A sugar stream 407 containing substantially no calcium ions and substantially no magnesium, but comprising sugar, potassium sulfate, sodium sulfate and ammonium sulfate is obtained from the resin bed of the chelating resin ion exchanger 405.

After the bed of the chelating resin in the chelating resin ion exchanger 405 is saturated with calcium and magnesium ions, it is regenerated by the addition of hydrochloric acid. This results in a regenerated stream 408 comprising the soluble salts calcium chloride and magnesium chloride, and excess hydrochloric acid. Regenerated stream 408 is then treated with ammonia and carbon dioxide in a calcium and magnesium precipitation step 410, as described previously, to precipitate calcium carbonate and magnesium carbonate which are then removed from solution by filtration at 414, or by any other solid/liquid separation technique as described hereinabove, and to provide a clarified salt stream 416. The amount of liquid in clarified salt stream 416 comprising ammonium chloride is then reduced by partial evaporation at 435 and this concentrated clarified salt stream is fed to a first cation exchanger 418 to convert the ammonium chloride to ammonium sulfate by regeneration with sulfuric acid. Because of the low solubility of magnesium carbonate and calcium carbonate as discussed above, magnesium carbonate and calcium carbonate precipitate during evaporation; the evaporator must be cleaned periodically. The hydrochloric acid produced during the feeding of the clarified salt stream to cation exchange 418 is recycled to regenerate the chelating resin 405.

The sugar stream 407 containing substantially no calcium ions obtained from the chelating resin bed 405 comprising sugar, salts of monovalent cations, namely, potassium sulfate, sodium sulfate and ammonium sulfate, but substantially no calcium or magnesium is fed to a second cation exchanger 415. As this sugar stream 407 is fed to the cation exchanger 415, the potassium, sodium and ammonium ions of the sulfate salts bind to the cation exchange resin therein, while sugar and acid as stream 432 pass through the cation exchange resin bed. The ion exchange resin in the cation exchanger 415 are then regenerated with sulfuric acid to obtain a product stream comprising potassium, sodium and ammonium salts, along with excess sulfuric acid. As shown, aqueous ammonia is added to the sulfate salts at 423 to convert the remaining sulfuric acid to ammonium sulfate. The result is a stream comprising potassium sulfate, sodium sulfate and ammonium sulfate.

Thus, it is seen that FIG. 4 is a variation of FIG. 3 where stream 408 is treated with aqueous ammonia and carbon dioxide in a calcium precipitation step to precipitate calcium carbonate and magnesium carbonate, which are then removed from that stream by filtration at 414.

The recovered sulfate salts are preferably used as a fertilizer, in which case they are purified by crystallization or electrodialysis, drying, or agglomeration and granulation. The purified salt can then be used as a liquid fertilizer, or alternately dried and used as a solid fertilizer.

DETAILED DESCRIPTION OF FIG. 4A

As seen in FIG. 4A the sugar hydrolyzate stream 452 contains calcium sulfate and magnesium sulfate and one or more sulfate salts of monovalent cations e.g., potassium, sodium and/or ammonium. That sugar stream is treated to remove the calcium and magnesium in precipitation step 460. This may be achieved by treating the sugar stream with a source of carbon dioxide to produce insoluble calcium carbonate and magnesium carbonate salts. One non-limiting example of a suitable source of carbon dioxide for this purpose is ammonium carbonate. The insoluble calcium carbonate and magnesium carbonate salts in salt stream 462 are then removed at filtration step 464 to produce a sugar stream 472 containing substantially no calcium ions, and comprising sugar and soluble sulfate salts of monovalent cations e.g., potassium, sodium and/or ammonium. This filtration step may be carried out by using other known methods for separating precipitated solids from liquids, such as, for example, centrifugation, microfiltration, plate and frame filtration, crossflow filtration, pressure filtration, vacuum filtration, settling and the like. The volume of liquid in that sugar stream containing substantially no calcium ions 472 may be reduced in evaporation step 485 and the more concentrated sugar stream 486 is then fed to a cation exchange resin in step 468. This cation exchange resin binds the cations of the remaining monovalent sulfate salts and produces a product sugar stream 480. The cation exchange resin bed is then regenerated with sulfuric acid at step 468 to obtain the sulfate salts of the monovalent cations 475.

The sugar streams 130 and 230 (FIGS. 1 and 2 respectively) or 332 and 432 (FIGS. 3 and 4, respectively) or 480 (FIG. 4A) may be further processed to remove sulfuric acid and organic acids, preferably by anion exchange. The sugar may then be fermented by microbes to produce a fermentation product, such as, for example, ethanol. For ethanol production, fermentation is typically carried out with a *Saccharomyces* spp. yeast. Preferably, glucose and any other hexoses typically present in the sugar stream are fermented to ethanol by wild-type *Saccharomyces cerevisiae*, although genetically modified yeasts may be employed as well. For example, if both glucose and xylose are present in the sugar stream, the fermentation may be performed with a recombinant *Saccharomyces* yeast that is engineered or obtained by artificial selection methods to ferment both hexose and pentose sugars to ethanol. Recombinant yeasts that can ferment the pentose sugar, xylose, to ethanol are described in U.S. Pat. No. 5,789, 210). Furthermore, arabinose and xylose may be converted to ethanol by the yeasts described in Boles et al. (WO 2006/096130).

Examples of additional fermentation products included within the scope of the invention include, but are not limited to, butanol, sorbitol, 1,3-propanediol and 2,3-butanediol. Other microorganisms that may be employed in the fermentation include wild-type or recombinant *Escherichia, Zymomonas, Candida, Pichia, Streptomyces, Bacillus, Lactobacillus* and *Clostridium*.

The present invention will be further illustrated in the following examples.

EXAMPLES

The following description is relevant to Examples 1-5.
Loading of Cation Exchanger
Solutions were loaded onto a Dowex® Monosphere® 88 resin, which is a strong cation exchange resin with a styrene-divinylbenzene (DVB) macroporous matrix and sulfonate functional groups. The resin was packed in a d=1.50 cm and l=150 cm glass column fitted with a glass frit and the column volume was 50 mL. Prior to use, the resin was charged into the hydronium form using about 6-about 10 bed volumes of 5% $H_2SO_4$. The resin was then rinsed with a minimum of 5 bed volumes of water until the pH of the eluent reached background levels. All elutions were conducted at room temperature.

Regeneration of Cation Exchanger
The columns were regenerated with 7% HCl unless otherwise specified. The HCl regenerant was run continuously through the column at about 5 to about 10 mL/min (about 1 to about 2 U.S. m/ft$^2$) at the feed concentration specified and eluent collected in pre-weighed test-tubes until cations were detected. The resin was rinsed with about 3 to about 5 bed volumes of water and discarded.

Sample Analysis

Cation concentrations were determined using a Dionex IonPac® CS16 high performance liquid chromatograph (HPLC) column or determined by an outside vendor. Anion concentrations (sulfate, acetate) and sugar concentrations (xylose) were determined using a Dionex IonPac® AS11-HC HPLC column and a CarboPac® PA1 HPLC column, respectively.

Example 1

Loading of Cation Exchange Resins with Potassium Sulfate, Magnesium Sulfate and Calcium Sulfate and Regeneration with HCl Three solutions of potassium sulfate having concentrations of 2.11, 2.11 and 2.03 g/L K$^+$ (referred to as runs 1, 2 and 3, respectively) were prepared and each applied to the Dowex® Monosphere® 88 resins prepared as described above. The elutions were conducted at a flow rate of 10-13 mL/min.

Figure 5:
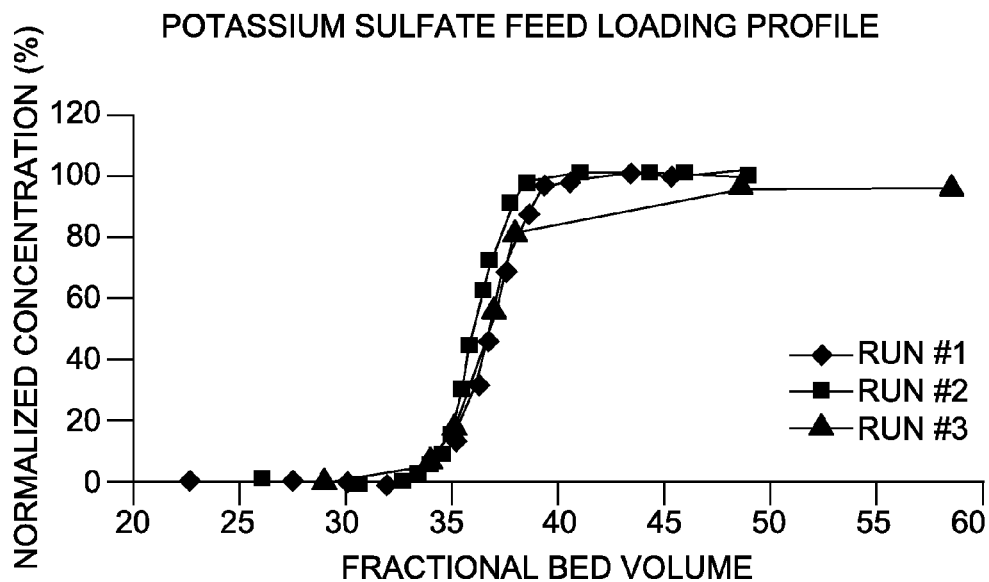
FIG. 5 is a graph showing three replicate loading profiles for a potassium sulfate feed using a cation exchange resin conditioned in the hydronium form.

The results show that the potassium loading elution profiles were reproducible (See FIG. 5). The 1% breakthrough of potassium for runs 1, 2 and 3 occurred at 32.85, 33.30 and 33.74 fraction bed volumes (FBV; which is the volume of solution fed divided by the bed volume).

Figure 6:
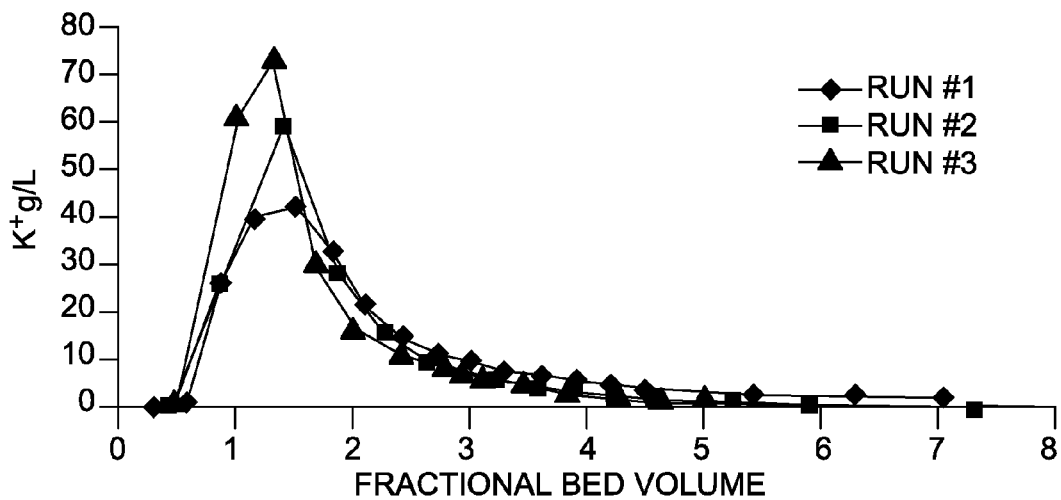
FIG. 6 is a graph showing the regeneration profiles for the potassium-loaded resins of FIG. 5 using HCl as the regenerant.

Three potassium-loaded resin columns fed with potassium sulfate solutions employed in runs 1, 2 and 3, respectively, were eluted co-currently with HCl. Runs 2 and 3 were eluted with 7% v/v HCl and run 1 was eluted with 3.32% v/v HCl. As shown in FIG. 6, the lower regenerant concentration in run 1 resulted in a lower peak concentration than in runs 2 and 3. However, beyond 2 bed volumes, all three profiles were very similar. The potassium recovery resulting from the regeneration was 98.1%, 102.8% and 110.0% for runs 1, 2 and 3, respectively.

Figure 7:
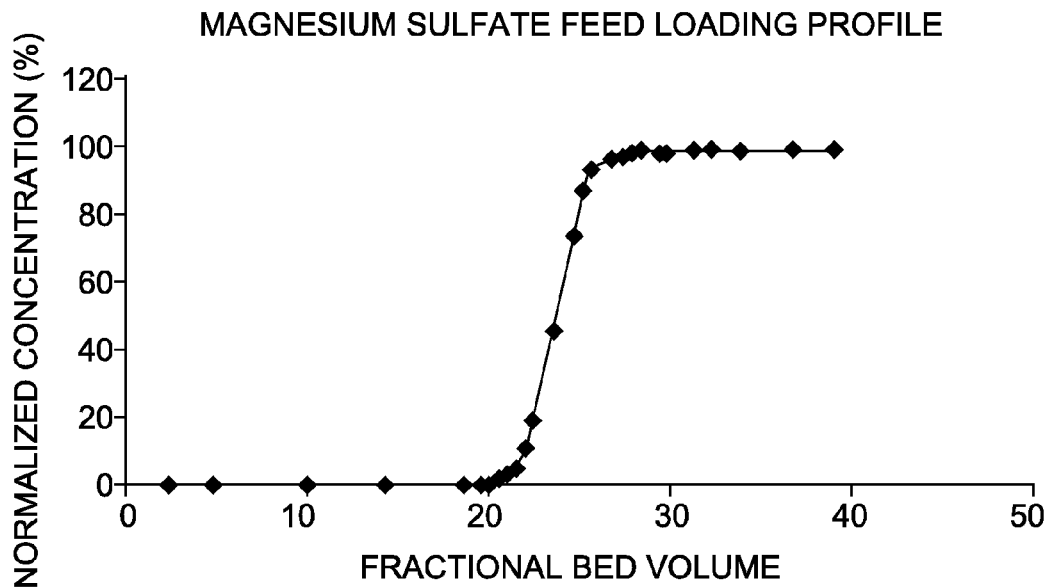
FIG. 7 is a graph showing the loading profile for a magnesium sulfate feed using a cation exchange resin conditioned in the hydronium form.

Loading and regeneration profiles were similarly generated for a magnesium sulfate feed using a Dowex® Monosphere® 88 resin prepared as described above. The feed concentration was 0.95 g/L Mg$^{2+}$ with an average flow rate of 12.51 mL/min. The loading profile of Mg$^{2+}$ is shown in FIG. 7.

Figure 8:
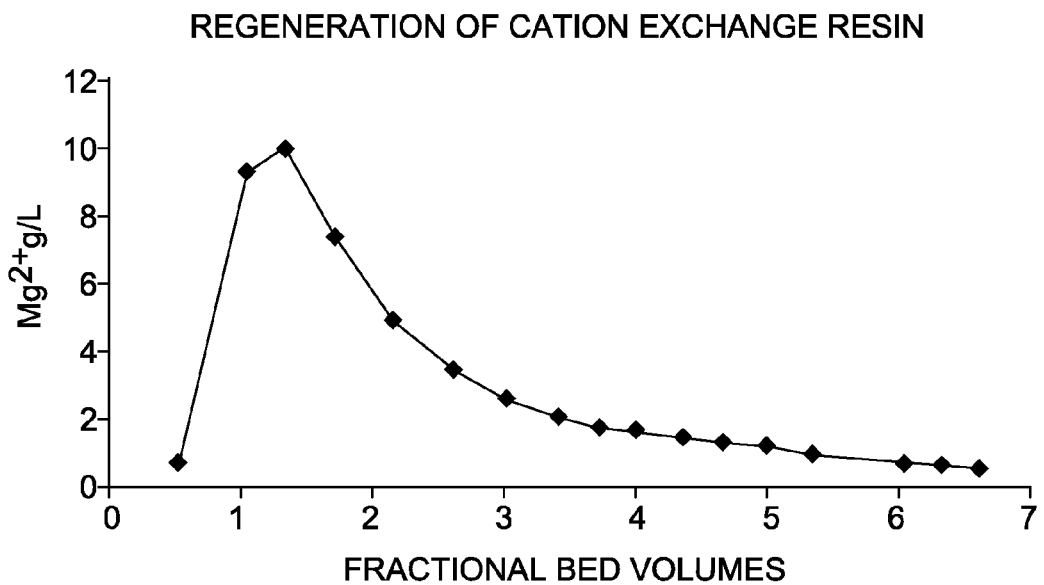
FIG. 8 is a graph showing the regeneration profile for the magnesium-loaded resin of FIG. 7 using HCl as the regenerant.

Regeneration of the Mg-loaded resin bed was then carried out with 4.03% v/v HCl co-currently. The regeneration profile is shown in FIG. 8. Most of the retained Mg$^{2+}$ was recovered (94%).

Figure 9:
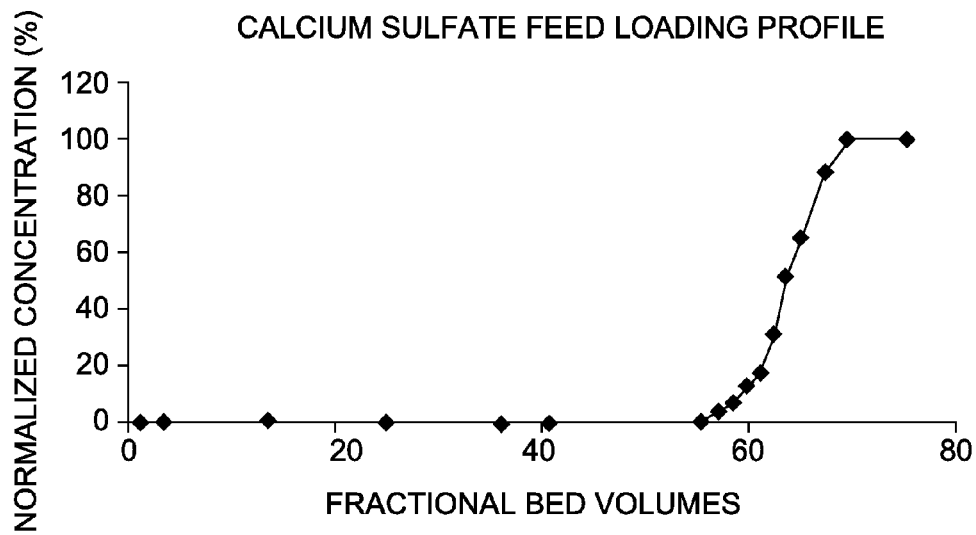
FIG. 9 is a graph showing the loading profile for a calcium sulfate feed using a cation exchange resin conditioned in the hydronium form.

Solutions containing CaSO$_4$ were prepared to investigate Ca$^{2+}$ breakthrough and elution profiles. Calcium is of particular interest since it is a divalent cation, has the greatest affinity for the resin and has low water solubility in the sulfate form (about 2 g/L or about 0.6 g/L Ca$^{2+}$). The feed concentration to the column was 0.46 g/L Ca$^{2+}$, which approximates the targeted concentration of 0.59 g/L Ca$^{2+}$ (the calcium concentration in a saturated CaSO$_4$ solution). A graph of the loading profile of Ca$^{2+}$ is shown in FIG. 9. The 1% breakthrough of Ca$^{2+}$ was 55.82 FBVs and the 100% breakthrough was 69.99 FBVs.

Figure 10:
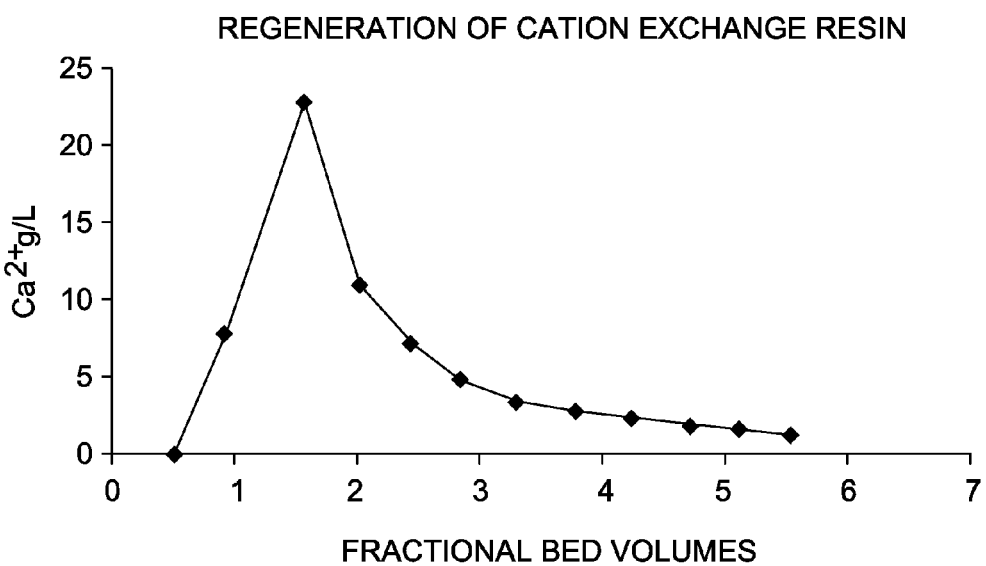
FIG. 10 is a graph showing the regeneration profile for the calcium-loaded resin of FIG. 9 using HCl as the regenerant.

Regeneration of the Ca$^{2+}$-loaded resin bed was then carried out by passing HCl through the resin bed. A graph of the regeneration profile of Ca$^{2+}$ is shown in FIG. 10.

Regeneration of a Ca$^{2+}$-loaded column was attempted using 2% H$_2$SO$_4$. Severe CaSO$_4$ precipitation occurred which clogged the column and tubing.

Example 2

Figure 11:
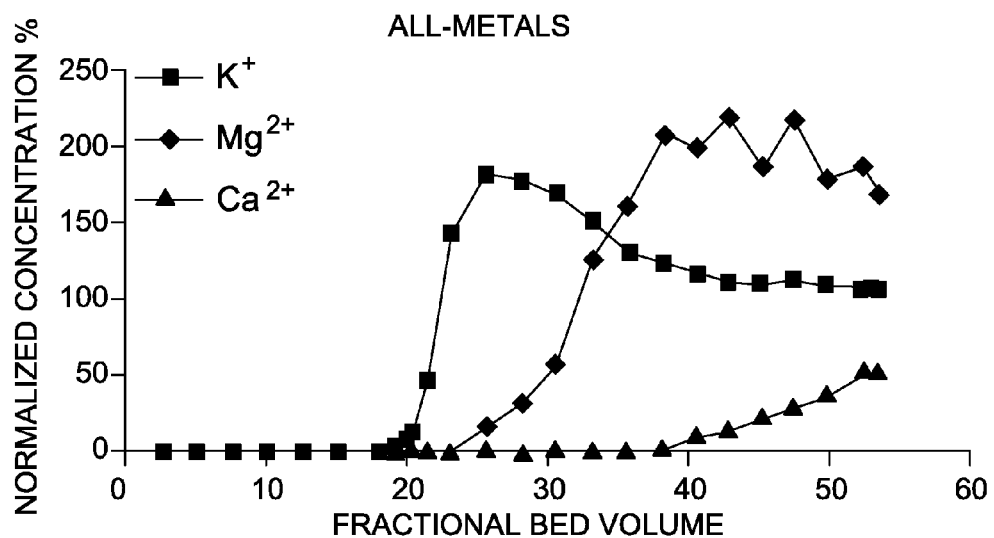
FIG. 11 is a graph showing the loading profile of potassium, magnesium and calcium with a feed containing potassium sulfate, magnesium sulfate and calcium sulfate and using a cation exchange resin conditioned in the hydronium form.

Loading of Cation Exchange Resins with Mixtures of Sulfate Salts and Regeneration with HCl A mixture containing potassium sulfate, calcium sulfate, magnesium sulfate and sodium sulfate was prepared to examine the effect of loading a multi-component system. The concentration of Na$^+$, K$^+$, Mg$^{2+}$ and Ca$^{2+}$ in the feed to the Dowex® Monosphere® 88 resin bed was 0.08, 1.86, 0.22 and 0.50 g/L, respectively. A graph of the loading profile is shown in FIG. 11.

Figure 12:
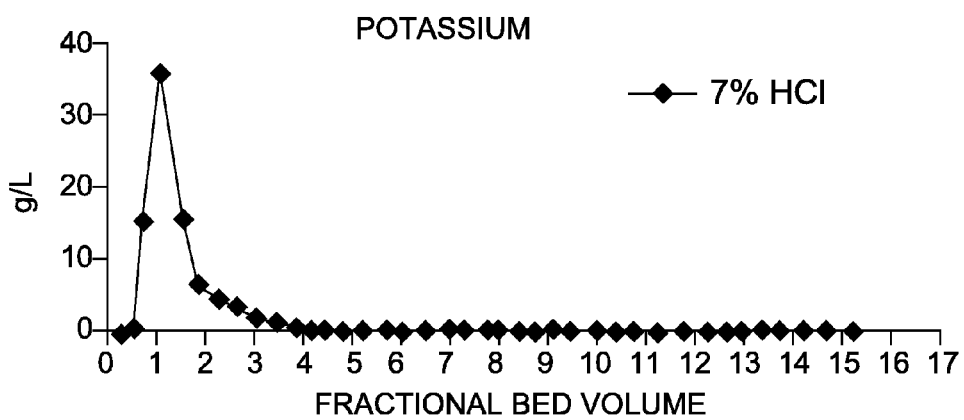
FIG. 12 is a graph showing the regeneration profile of potassium regenerated with HCl for the column loaded with potassium, magnesium and calcium.
Figure 13:
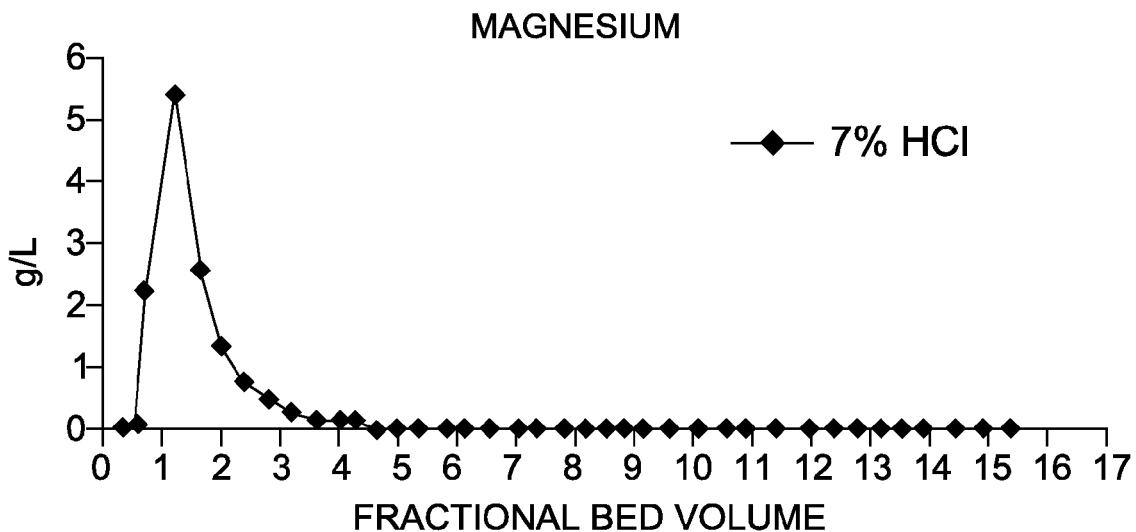
FIG. 13 is a graph showing the regeneration profile of magnesium regenerated with HCl for the column loaded with potassium, magnesium and calcium.
Figure 14:
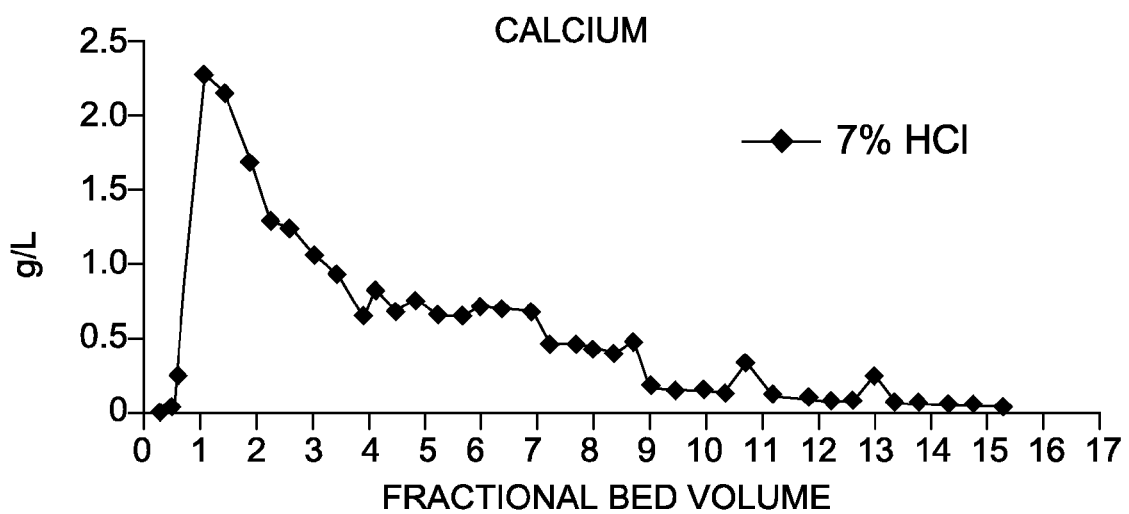
FIG. 14 is a graph showing the regeneration profile of calcium regenerated with HCl for the column loaded with potassium, magnesium and calcium.

Columns loaded with these salts were regenerated with 7% HCl. The resin was loaded with the feed until just prior to K$^+$ breakthrough and regenerated. Graphs of the regeneration profiles for potassium, magnesium and calcium are shown in FIGS. 12, 13 and 14, respectively.

Example 3

Loading of Cation Exchange Resins with a Sugar Solution and Regeneration with HCl Wheat straw was pretreated at 185° C., pH 1.0 with 1 wt % sulfuric acid in a manner consistent with the description in Foody, U.S. Pat. No. 4,461,648. After pretreatment, the straw was washed with water to produce a sugar solution. The non-neutralized sugar solution was doped with calcium, magnesium and potassium sulfate salts, as well as xylose, sulfuric acid and acetic acid to obtain target concentrations for each of these components. Target concentrations for Ca$^{2+}$, Mg$^{2+}$, Na$^+$ and K$^+$ were 0.59 g/L, 0.23 g/L, 0.05 g/L and 1.89 g/L, respectively and target concentrations for sulfuric acid, acetic acid and xylose were 8.28 g/L, 6.52 g/L and 49 g/L, respectively.

Figure 15:
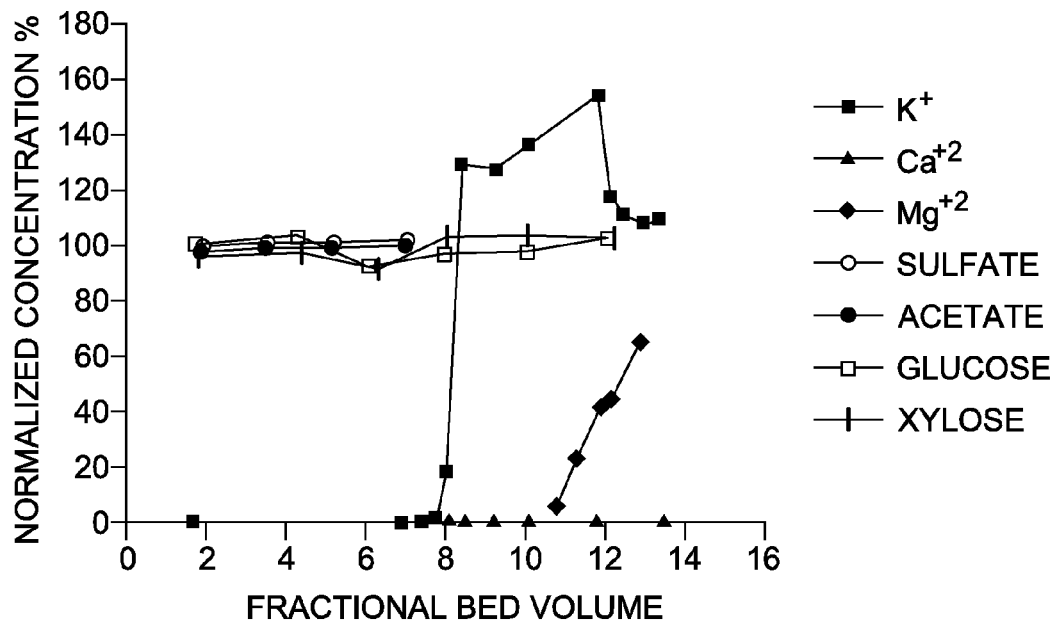
FIG. 15 is a graph showing the loading profile of potassium, calcium, magnesium, sulfate, acetate, glucose and xylose using a sugar hydrolyzate stream from pretreated wheat straw as the feed.

The sugar solution was fed to a Dowex® Monosphere® 88 resin bed prepared as described previously. The elution profiles of K$^+$, Ca$^{2+}$, Mg$^{2+}$, sulfate, acetate, glucose and xylose in the sugar solution is shown in FIG. 15. The order of cation breakthrough corresponded with the known selectivity coefficients for this resin, while xylose, glucose, sulfate and acetate concentrations remained constant throughout the run.

Figure 16:
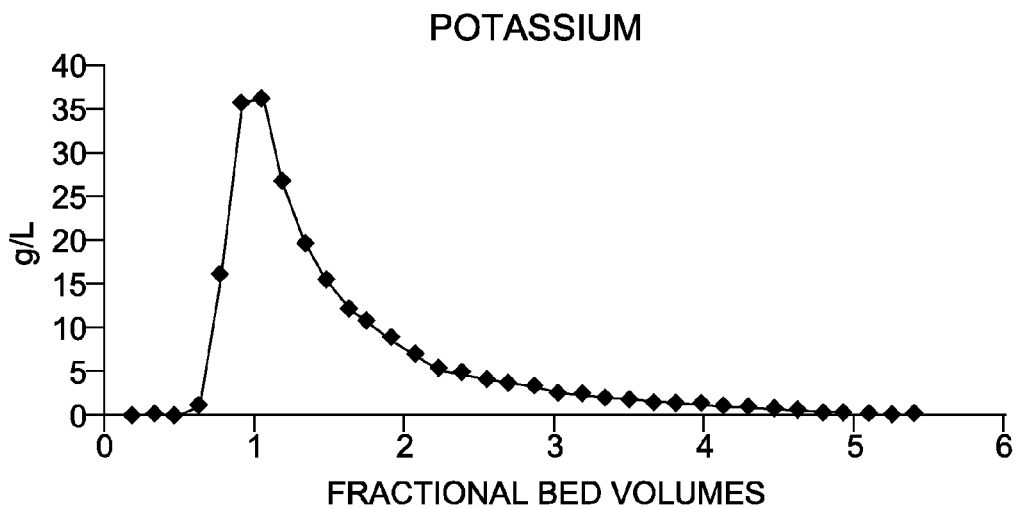
FIG. 16 is a graph showing the regeneration profile of potassium regenerated with HCl for the column loaded with cations present in the sugar hydrolyzate stream.
Figure 17:
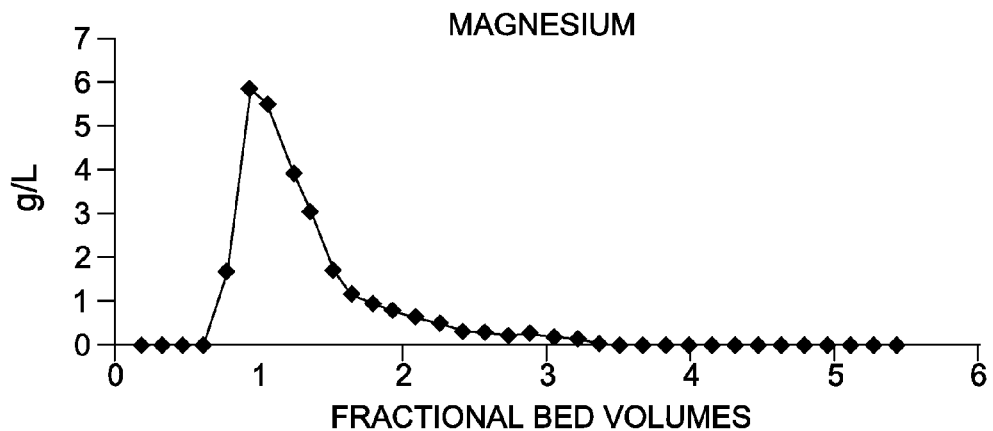
FIG. 17 is a graph showing the regeneration profile of magnesium regenerated with HCl for the column loaded with cations present in the sugar hydrolyzate stream.
Figure 18:
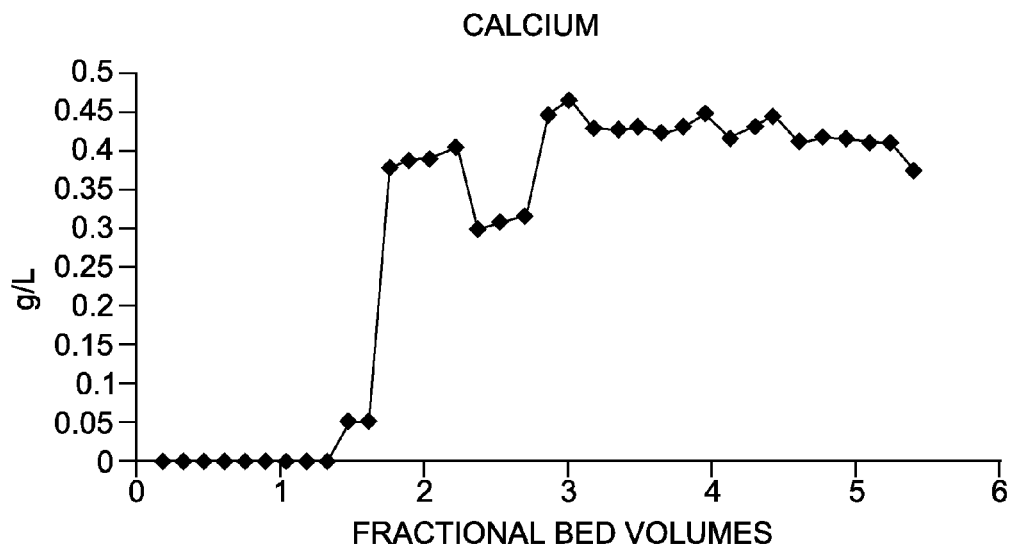
FIG. 18 is a graph showing the regeneration profile of calcium regenerated with HCl for the column loaded with cations present in the sugar hydrolyzate stream.

A column loaded with K$^+$, Mg$^{2+}$ and Ca$^{2+}$ present in the sugar solution was regenerated with HCl. A graph of the regeneration profiles of K$^+$, Mg$^{2+}$ and Ca$^{2+}$ are shown in FIGS. 16, 17 and 18, respectively.

Example 4

Precipitation of Calcium Carbonate and Magnesium Carbonate

The purpose of this example was to demonstrate that the addition of CO$_2$ to calcium chloride and magnesium chloride will precipitate the carbonate salts.

This example was conducted on aqueous solutions of CaCl$_2$, MgCl$_2$, KCl and NH$_4$Cl that were made to simulate a stream eluting from, for example, the first cation exchange system of FIG. 2 upon regeneration with monovalent salts. The chloride salt streams were placed in a 250 mL Erlenmeyer flask with 100 mL liquid volume at ambient temperature, mixed with a magnetic stir bar. For these experiments, approximately 100 µL of 28-30 wt % NH$_3$ (aq) was added to the aqueous salt feed streams slowly (in 100 μL aliquots) to maintain a pH of 7-8. For all three experiments the $CO_2$ was added for approximately 10 minutes and the flow rate was, on average, 2 mL/min. The $NH_3$ (aq) was added in 10 equal aliquots of 0.1 mL after the pH dropped below 7. If the $CO_2$ is added at 4 mL/min the pH drops faster and more $NH_3$ (aq) is required; therefore, the overall reaction time would be shorter. However, at this flow rate some of the $CO_2$ would be lost to the atmosphere. The flasks were capped with rubber bungs which consisted of openings to facilitate the addition of $CO_2$ and $NH_3$ (aq). After the $CO_2$ and $NH_3$ (aq) addition, the flasks were parafilmed.

The $NH_3$ (aq) stock was at a concentration of 28-30 wt % at a density of 0.9 g/mL. Therefore, the $NH_3$ concentration with 1 ml added to 100 mL is 2.5-2.7 g/L.

Precipitated salts were separated by vacuum filtration with a Buchner funnel over glass microfiber filter paper. Cation analysis was carried out on the filtrates and Table 1 below describes the concentrations of the cations in the filtrate.

TABLE 1

The concentration of the cations and the yield of the carbonates formed during precipitation reactions using $NH_3$ (aq) and $CO_2$.

|  | Sample 1 | | Sample 2 | | Sample 3 | |
| --- | --- | --- | --- | --- | --- | --- |
|  | Initial Conc. (g/L) | Conc. after ppt. (g/L) | Initial Conc. (g/L) | Conc. after ppt. (g/L) | Initial Conc. (g/L) | Conc. after ppt. (g/L) |
| Cations | | | | | | |
| $Ca^{2+}$ | 0.563 | 0.100 | 0.563 | 0.087 | 0.566 | 0.182 |
| $Mg^{2+}$ | 0.138 | 0.137 | 0.133 | 0.115 | 0.135 | 0.132 |
| $NH_4^+$ | — | 2.961 | 3.367 | 5.562 | 3.369 | 5.414 |
| $K^+$ | — | — | — | — | 2.144 | 1.894 |
| Precipitant Yield (%) | | | | | | |
| $Mg^{2+}$ | <1 | | 13.5 | | 3 | |
| $Ca^{2+}$ | 82 | | 85 | | 68 | |
| Carbonates | 60 | | 63 | | 55 | |
| Final pH | 6.70 | | 7.07 | | 8.04 | |

The concentration of $NH_4^+$ (in the form of $NH_4Cl$) observed for sample 1 without $NH_4^+$ initially present is from the $NH_3$ (aq) added during the precipitation reaction.

The concentration of the $Ca^{2+}$ in the filtrate is 0.1 to 0.18 g/L, which is much less than its initial concentration. This is consistent with a solubility of calcium carbonate of 0.25-0.5 g/L. The concentration of magnesium in the filtrate is 0.11-0.14 g/L which is similar to the initial concentration used in these experiments. This is consistent with a solubility of magnesium carbonate of 0.4-0.5 g/L.

The KCl and $NH_4Cl$ in the filtrate, and the calcium carbonate and magnesium carbonate at their solubility limits after the carbonate precipitation, are then used in regeneration of the first cation exchange system of FIG. 2, for example.

Example 5

Loading and Regeneration of Cation Exchange Column

The purposes of this example were to demonstrate: (1) the loading of calcium and magnesium onto a column of resin conditioned with ammonium and potassium cations, and (2) the regeneration of the resin, bound with calcium and magnesium, with a solution of ammonium chloride and potassium chloride salts.

Feed Solutions

Three feed solutions were used for this example. The concentrations of the cations in the feed solutions were chosen to simulate an actual stream resulting from the conversion of a lignocellulosic feedstock and are listed in Table 2. The feed solutions were prepared by dissolving xylose and the sulphate salts of the cations in deionized water. The feed solutions were left to stir for at least overnight because of the low solubility of $CaSO_4$ in water (0.24 g/100 mL) and $CaSO_4$ was always added in excess of the solubility limit. The concentrations of the cations in the feed solutions is shown below in Table 2.

TABLE 2

Concentrations of the cations in the feed solutions

| Cations | Feed 1 g/L | Feed 2 g/L | Feed 3 g/L |
| --- | --- | --- | --- |
| $K^+$ | — | — | 1.810 |
| $NH^{4+}$ | — | — | 3.067 |
| $Mg^{2+}$ | 0.167 | 0.831 | 0.154 |
| $Ca^{2+}$ | 0.460 | 0.523 | 0.342 |

Resin and Conditioning with Potassium and Ammonium Salts

The strong cation exchange Dowex® Monosphere 88® resin was used. It has a styrene-divinylbenzene macroporous matrix with sulfonate functional groups. Its properties include: minimum total exchange capacity of 1.8 eq/L and particle size distribution volume median diameter of 500-600 μm. Fresh resin was washed three times with water and 100 ml of the washed resin was packed in a 1.5×150 cm glass column. The resin is sold in the $Na^+$ form so 4 bed volumes (BV) of 5 wt. % $H_2SO_4$ was used to convert it to the hydronium form. The resin was then washed with 25 BV of water or until the pH of the eluent was >5.5.

Six BV of the 7 wt % total chloride salt solution of $K^+:NH4^+$ in ratio 1:2 were then used to condition the resin. The resin was again washed with 25 BV of water or until the pH was <8. Table 3 shows the concentration of the conditioning solution used for the resin. The resin was conditioned at a flow rate of approximately 10 ml/min. This resin functions as a strong acid cation exchanger with the following selectivity: $Ca^{2+}>Mg^{2+}>K^+>NH4^+$. The concentrations of the conditioning and regenerating solutions is shown below in Table 3.

TABLE 3

Concentrations of the conditioning & regenerating solutions

| | Conditioning Solution (g/L) (7% total w/v chloride salt solution of $K^+:NH^{4+}$ in ratio 1:2) | Regenerating Solution (g/L) (7% total salt solution 1:2 $KCl/NH_4Cl$) |
| --- | --- | --- |
| $K^+$ | 21.45 | 12.04 |
| $NH^{4+}$ | 41.07 | 15.10 |

Column Loading

Feed solutions were continuously run through the 100 ml of conditioned resin at ambient temperature and the eluent fractions were collected in pre-weighed test tubes. To determine the cation elution profiles at least 40 BV of feed was loaded onto the resin, while for regeneration studies, the feed was loaded to 1% $Mg^{2+}$ breakthrough and then the resin was regenerated. The average flow rate was 9 ml/min and the fractions were collected at 2 minute intervals. After column loading and resin regeneration, the resin was washed with 1 BV of deionized water, which was collected and analyzed.

Regeneration of the Resin

Regeneration profiles were only generated for Feed #3. This feed (15.5 BV) was loaded to just before the 1% is $Mg^{2+}$ breakthrough point. The column was then washed with 1 BV of water, then regenerated with 15 BV of 7 wt % total salt solution of ratio 1:2 of KCl: NH4Cl. Table 2 shows the concentration of the regenerating solution used for the resin. The resin was regenerated with flow co-current with the loading flow and the fractions were collected, weighed and analyzed by the use of the Dionex® ICS 3000 HPLC.

Sample Analysis

The eluent was first weighed and the mass of the pre-weighed test tube was subtracted to obtain the volume of the sample eluting from the column. The density was assumed to be 1 g/mL. The pH and conductivity of the samples were then measured and samples were chosen at random for cation analysis. The CS16 conductivity method on the Dionex® ICS 3000 high performance liquid chromatography (HPLC) with Chromeleon® software was used to determine the cation concentrations. The concentrations of the cations are expressed in g/L and as normalized concentration relative to the feed concentration. The concentration is then plotted as a function of the feed bed volumes which is the cumulative volume eluted at each collected sample divided by the total volume of resin used.

Elution of Feeds 1 and 2

Figure 19:
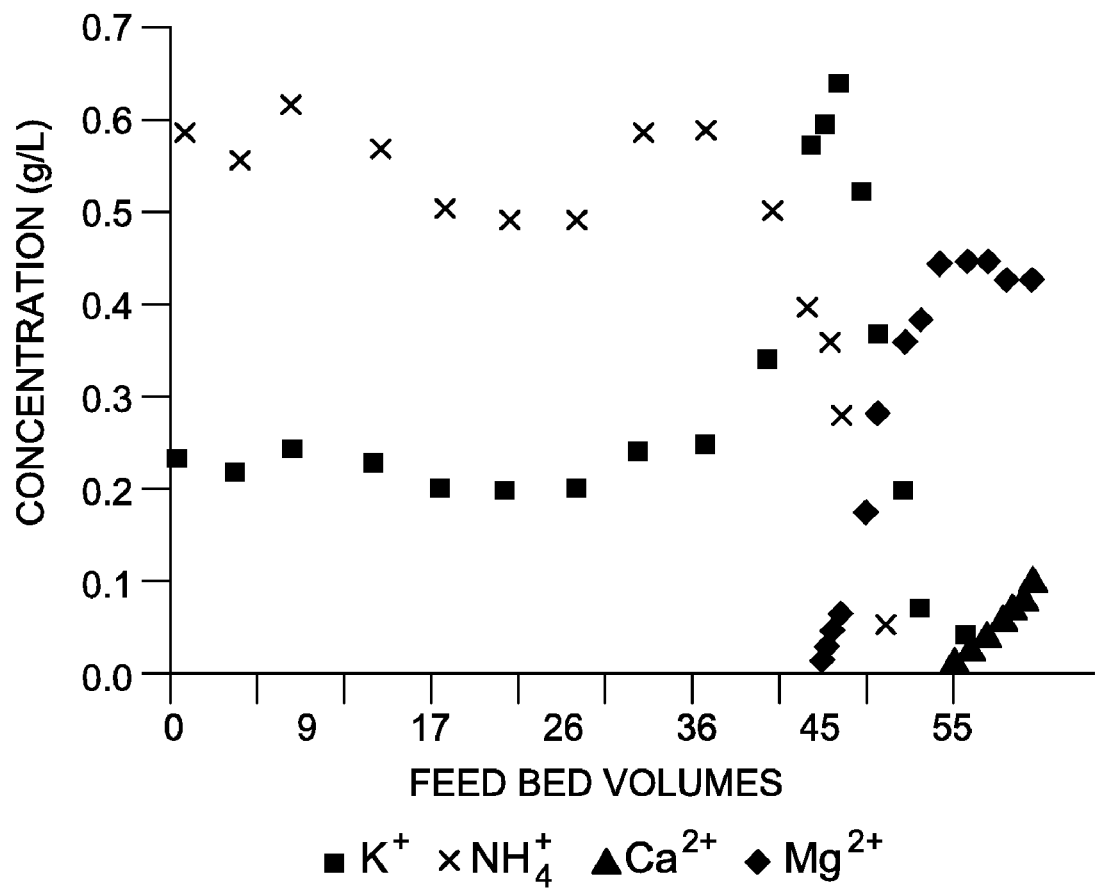
FIG. 19 is a graph showing an elution profile for feed 1 of Example 5.

Feeds 1 and 2 contained only the divalent cations calcium and magnesium. FIG. 19 is a graph showing the elution profiles for these feeds, and the data are summarized below in Table 4. The elution of ammonium and potassium results from the presence of these ions on the resin after conditioning. These monovalent ions start to elute almost immediately, due to their low affinity for the resin. $Ca^{2+}$ breakthrough required 55 bed volumes of feed, and was therefore not observed with Feed 1, which only went to 40 bed volumes. The $Mg^{2+}$ concentration was 5 times higher in Feed 2 than in Feed 1. This accounts for the earlier $Mg^{2+}$ breakthrough observed with Feed 2 than Feed 1. The resin utilized by the $Mg^{2+}$ increased two-fold, from 34.4% to 70%, between Feed 1 and Feed 2. At $Mg^{2+}$ breakthrough, some $K^+$ and $NH4^+$ are still be bound to the resin and therefore the total working capacities for $Ca^{2+}$ and $Mg^{2+}$ were slightly less than the theoretical capacity of 1.8 eq/L.

Figure 20:
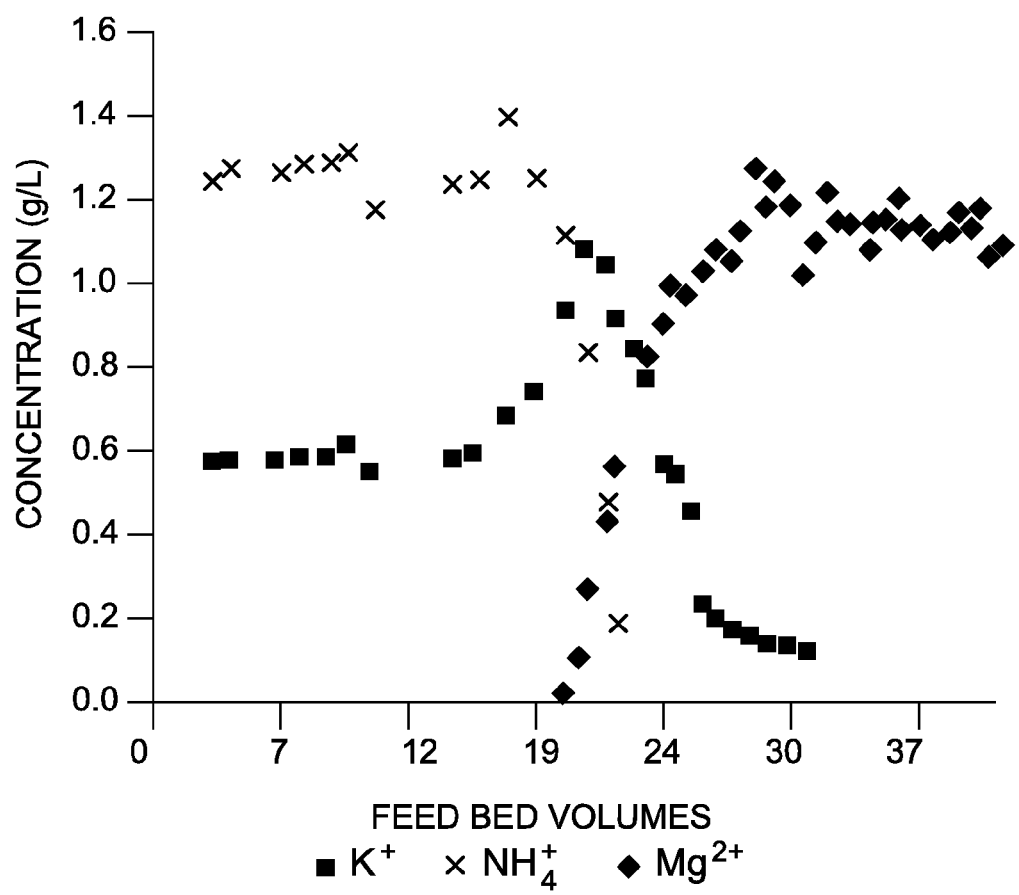
FIG. 20 is a graph showing an elution profile for feed 2 of Example 5.
Figure 21:
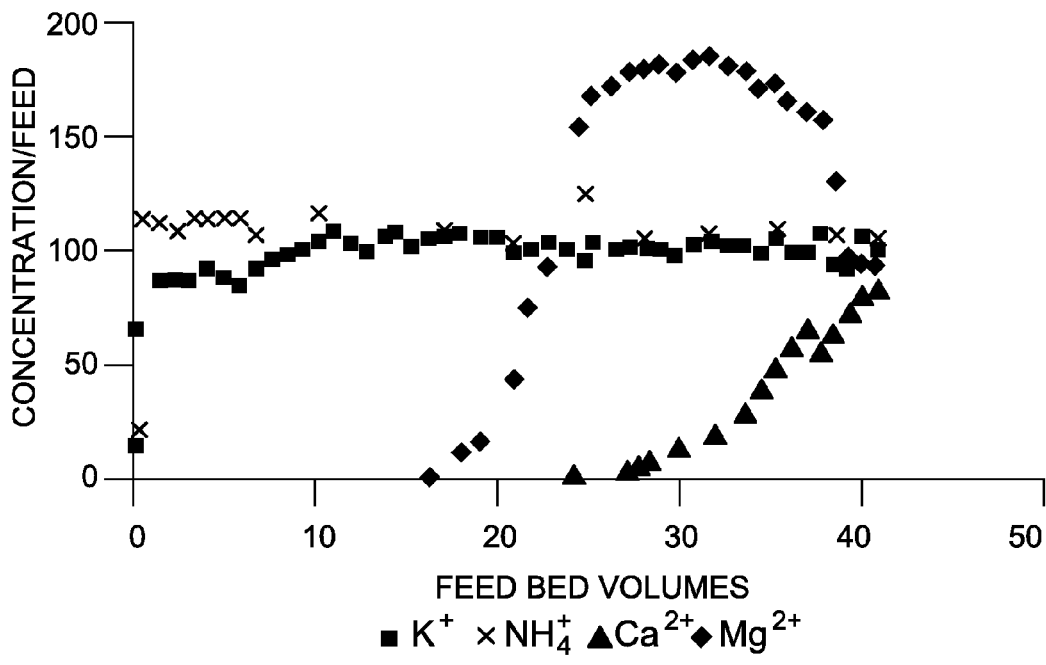
FIG. 21 is a graph showing an elution profile for feed of Example 5.

The concentration of $K^+$ increases as the $Mg^{2+}$ breaks through, as illustrated in FIG. 20. This results from two bound monovalent $K^+$ ions being expelled from the resin by each molecule of the divalent $Mg^{2+}$, which has a stronger affinity for the resin. There is also a slight increase in the $NH^{4+}$ concentration, also illustrated in FIG. 19, which occurs because the $K^+$ displaces the $NH^{4+}$ as it is being displaced by the $Mg^{2+}$.

Elution of Feed 3

Feed 3 was composed of $K^+$, $NH_4^+$, $Mg^{2+}$ and $Ca^{2+}$. FIG. 20 shows the elution profiles for all the cations. Table 5 below provides comparative breakthrough data for Feeds 1 and 2 and Feed 3. As expected, the divalent cations break through earlier with Feed 3 than Feeds 1 and 2. The addition of the monovalent ions results in an increase in the competition for the resin sites. Therefore, the $Mg^{2+}$ breakthrough in Feed 3 was earlier than with Feeds 1 and 2. To assess further the effects of the presence of the monovalents on the divalents, the resin capacities were calculated. The capacity data are all presented in Table 6 below.

TABLE 5

Mg and Ca breakthrough

| | FBV to breakthrough | |
|---|---|---|
| Cation | Feeds 1 and 2 | Feed 3 |
| $Mg^{2+}$ | 45.0 | 16.5 |
| $Ca^{2+}$ | 54.5 | 24.9 |

TABLE 6

Resin capacity

| Cation | Capacity (Eq/L) |
|---|---|
| Total | 1.76 |
| NH4+ | 0.58 |
| K+ | 0.47 |
| $Mg^{2+}$ | 0.11 |
| $Ca^{2+}$ | 0.60 |

Regeneration of the Resin

Figure 22:
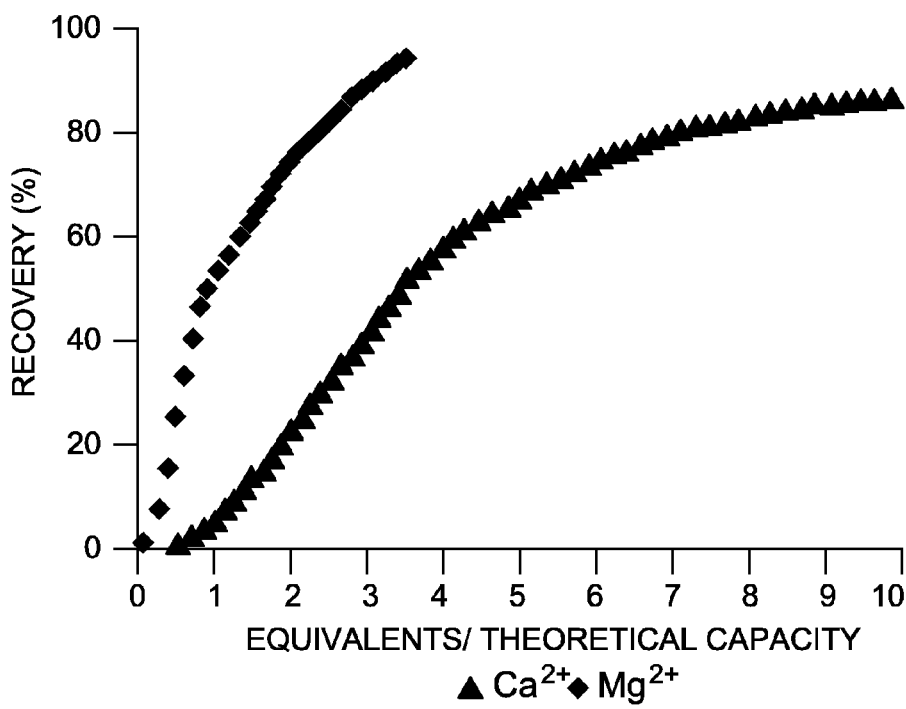
FIG. 22 is a graph showing a co-current recovery regeneration profile for $Mg^{2+}$ and $Ca^{2+}$ of Example 5.
Figure 23:
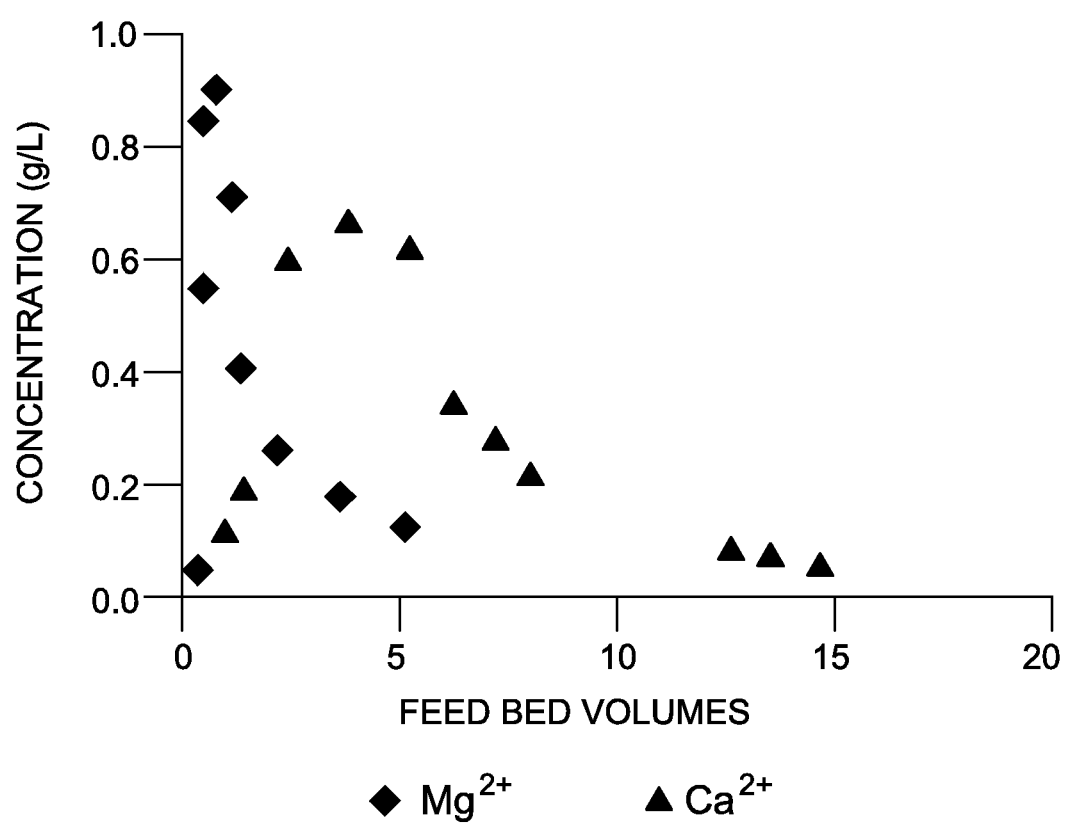
FIG. 23 is a graph showing a co-current recovery regeneration profile for $Mg^{2+}$ and $Ca^{2+}$ of Example 5.

Feed 3 was loaded (15.5 FBV) and regenerated in the co-current direction with 1.5 Liters of 7 wt % total salt solution with a ratio of potassium chloride to ammonium chloride of 1:2 KCl/NH4Cl. FIGS. 22 and 23 are graphs showing the recovery profiles for calcium and magnesium, respectively. Not surprisingly, the $Mg^{2+}$ peak was much sharper than that of $Ca^{2+}$. After approximately 3 equivalents regenerant/theoretical capacity, about 90% of the $Mg^{2+}$ was recovered but only about 40% of the $Ca^{2+}$ was recovered. A 90% recovery of calcium requires 10 equivalents of regenerant per equivalent of bound calcium. This demonstrates that the calcium and magnesium can be removed from the bound cation exchange resin by the monovalent salt stream. Regenerating the resin in a counter-current direction will greatly increase the efficiency of the $Ca^{2+}$ removal.

TABLE 4

Elution data for feeds 1 and 2

| | Feed 1 | | | Feed 2 | | |
|---|---|---|---|---|---|---|
| | FBV at 1% Cation Breakthrough | Dynamic capacity (eq/L)* | % Resin Utilized# | FBV at 1% Cation Breakthrough | Dynamic capacity (eq/L)* | % Resin Utilized# |
| $Mg^{2+}$ | 45.0 | 0.62 | 34.4 | 18.5 | 1.26 | 70.0 |
| $Ca^{2+}$ | 54.5 | 1.03 | 57.2 | >40.0 | 0.48 | 26.7 |
| Total | | 1.65 | 92 | | 1.75 | 97 |

*Dynamic capacities were calculated at 1% $Mg^{2+}$ breakthrough
Calculated by dividing the dynamic capacity by the theoretical resin capacity of 1.8 eq/L

Example 6

Salt Processing from a Sugar Stream Resulting from the Hydrolysis of a Lignocellulosic Feedstock This example follows the flowsheet of FIG. 2. Wheat straw (750 t/d) is received at the plant in bales, which are broken up and fed to a steam/dilute acid pretreatment system, as described by Foody, U.S. Pat. No. 4,461,648. After pretreatment, the slurry is sent over a decanter centrifuge to separate the sugar hydrolyzate stream 202 from the pretreated solids. The sugar stream 202 has a flow rate of 178,000 L/h. The sugars in this stream are xylose (29 g/L), arabinose (3.7 g/L), glucose (3.2 g/L), galactose (1.6 g/L), and mannose (0.6 g/L). Other organic compounds in the sugar stream include soluble lignin (4.8 g/L), acetic acid (3.5 g/L), glucuronic acid (0.4 g/L), and furfural (1.0 g/L). The sugar stream contains the inorganic salts ammonium sulfate (10.1 g/L), potassium sulfate (4.1 g/L), calcium sulfate (0.5 g/L), and magnesium sulfate (0.5 g/L). The sugar stream also contains the organic salts ammonium acetate (2.8 g/L) and ammonium glucuronate (0.7 g/L). Those skilled in the art are aware that the sugar stream also contains numerous other compounds and that obtaining a complete identification and quantification of these compounds is very difficult.

The sugar stream 202 is fed to a first cation exchange system 206 to remove the calcium. The cation exchange system 206 consists of two parallel columns ("A" and "B") of volume 60 cubic meters each, of diameter 2 meters. The system is operated at a temperature of 60° C. The columns are packed with Dow Monosphere® 88 cation exchange resin, which is described in Example 5. As the sugar stream is fed to a column at a flow rate of 178,000 liters/hr, the sugars, organics, and organic salts 207 elute with very little affinity for the resin. The monovalent cations potassium and ammonium bind to the resin and desorb as these ions have a lower affinity than the divalent ions calcium and magnesium. These cations elute as their sulfate salts 207. The calcium and magnesium bind to the resin.

After 16 bed volumes of feed 202, magnesium breaks through. Calcium has a higher affinity than magnesium and has not yet broken through. At this point, the feed to column A is stopped and feed to column B is begun. The presence of 2 columns in parallel allows feed of the sugar stream to take place continuously. Column A is washed with a bed volume of water, with the eluent collected and combined with the feed stream 202, so as to not lose the sugar held up in the void of the column.

The sugar stream 207 which has eluted from Column A prior to calcium breakthrough contains less than 3 mg/L calcium and therefore contains substantially no calcium ions. This stream 207 has a flow rate of 192,000 L/hr and a composition of xylose (27 g/L), arabinose (3.4 g/L), glucose (3.0 g/L), galactose (1.5 g/L), and mannose (0.6 g/L). Other organic compounds in the sugar stream 207 include soluble lignin (4.5 g/L), acetic acid (3.3 g/L), glucuronic acid (0.4 g/L), and furfural (0.9 g/L). The sugar stream also contains the inorganic salts ammonium sulfate (10.3 g/L) and potassium sulfate (3.9 g/L). The sugar stream also contains the organic salts ammonium acetate (2.7 g/L) and ammonium glucuronate (0.9 g/L). Those skilled in the art are aware that the sugar stream also contains numerous other compounds and that obtaining a complete identification and quantification of these compounds is very difficult.

The sugar stream 207 having had calcium and magnesium removed is fed to the second cation exchange system. The cation exchange system consists of two parallel columns ("C" and "D") of volume 60 cubic meters each, of diameter 2 meters. The system is operated at a temperature of 60° C. The columns are packed with Dow Monosphere 88® cation exchange resin, which is described in Example 5. As the sugar stream is fed to a column at a flow rate of 192,000 liters/hr, the sugars, organics, organic acids, and sulfuric acid elute with very little affinity for the resin. The cations potassium and ammonium bind to the resin, releasing sulfuric acid and organic acids into the eluent stream. The process feed is continued until the cations break through, which occurs after about 4 bed volumes are fed. At this point, the feed is stopped in Column C and started in Column D. Column C is washed with a bed volume of water, and this wash stream is combined with the process feed to maintain sugar yields.

The eluent containing sugar 230 and acids has a flow rate of 206,000 L/hr. This stream has a composition of xylose (24.1 g/L), arabinose (3.1 g/L), glucose (2.7 g/L), galactose (1.4 g/L), and mannose (0.5 g/L). Other organic compounds in the sugar/acid stream include soluble lignin (4.1 g/L), acetic acid (4.6 g/L), glucuronic acid (1.0 g/L), and furfural (1.0 g/L). The sugar/acid stream also contains 9.5 g/L sulfuric acid. Those skilled in the art are aware that the sugar/acid stream also contains numerous other compounds and that obtaining a complete identification and quantification of these compounds is very difficult. This stream is sent to an anion exchange system for further purification.

Column C in the second cation exchange system 218 is then regenerated with 5.5% (w/w) sulfuric acid. This stream is made up from a 93% sulfuric acid stock that is diluted with water. Four bed volumes of regenerant are fed counter-current to the process feed and water wash, that is, in an upward direction. This is sufficient regenerant to desorb the adsorbed cations and convert the resin to the $H^+$ form. Column C is then washed with one bed volume of water and the drained acid combined with the acid regenerant pool.

The desorbed salt stream 225 consists primarily of ammonium sulfate and potassium sulfate salts. This stream has a flow rate of 48,000 L/hr and a composition of 50.4 g/L ammonium sulfate, 19 g/L sulfuric acid, and 15.1 g/L potassium sulfate. The stream also contains 5 g/L organic compounds. This stream is suitable for further processing to make fertilizer or other products.

Referring back to the first cation exchange system 206, Column A is regenerated with a clarified salt stream 216, the production of which is described below. This stream has a flow rate of 1760 L/hr of 11.5% ammonium chloride solution. Regeneration is carried out in a direction countercurrent to the loading and bed washing. The ammonium displaces the adsorbed calcium and magnesium cations. After regeneration, Column A is washed with 13,700 L/hr of water to fully displace the desorbed cations. The desorbed salt stream 218 has a flow rate of 15,800 L/hr and is composed of 4.7 g/L calcium chloride and 4.4 g/L magnesium chloride.

The calcium/magnesium chloride stream 218 is subjected to carbon dioxide to precipitate the carbonate salts. Carbon dioxide is added to the precipitation tank 210 at a rate of 61 kg/hr. The precipitation is carried out at ambient temperature in a tank of volume 5000 liters. As the carbon dioxide reacts with calcium or magnesium, it produces a molecule of hydrochloric acid. A stream of 47 kg/hr of ammonia is added to neutralize the HCl and maintain an alkaline pH. The neutralization of HCl with ammonia produces ammonium chloride.

A small amount of magnesium carbonate and calcium carbonate at a concentration of about 0.5 g/L remain in solution. The stream containing calcium carbonate, magnesium carbonate, and ammonium chloride 212 is filtered 214 on a filter press to remove the precipitated salts and produce a dilute clarified salt stream 222. The filter cake is produced at a rate of 316 kg/hr at 41% solids, the solids consisting of 52% calcium carbonate and 48% magnesium carbonate.

The clarified salt stream 222 is evaporated in a 4-effect falling film evaporator. This removes 87% of the water from the stream and produces the concentrated clarified salt stream 216 which contains primarily ammonium chloride that is used to regenerate the first cation exchange system. The small amount of magnesium carbonate and calcium carbonate that are in the stream 222 fed to the evaporator precipitate as the water is removed. The precipitant is removed by washing the surface of the evaporator periodically with dilute hydrochloric acid Example 7

Salt Processing from a Sugar Stream Resulting from the Hydrolysis of a Lignocellulosic Feedstock This example follows the flowsheet shown in FIG. 2. Wheat straw (750 t/d) is received at the plant in bales, which are broken up and fed to a steam/dilute acid pretreatment system, as described by Foody, U.S. Pat. No. 4,461,648. After pretreatment, the slurry is sent over a decanter centrifuge to separate the sugar stream from the pretreated solids. The hydrolyzate sugar stream 202 has a flow rate of 178,000 L/h. The sugars in this stream are xylose (29 g/L), arabinose (3.7 g/L), glucose (3.2 g/L), galactose (1.6 g/L), and mannose (0.6 g/L). Other organic compounds in the sugar stream include soluble lignin (4.8 g/L), acetic acid (3.5 g/L), glucuronic acid (0.4 g/L), and furfural (1.0 g/L). The sugar stream contains the inorganic salts ammonium sulfate (10.1 g/L), potassium sulfate (4.1 g/L), calcium sulfate (0.5 g/L), and magnesium sulfate (0.5 g/L). The sugar stream also contains the organic salts ammonium acetate (2.8 g/L) and ammonium glucuronate (0.7 g/L). Those skilled in the art are aware that the sugar stream also contains numerous other compounds and that obtaining a complete identification and quantification of these compounds is very difficult.

The sugar stream 202 is fed to a first cation exchange system 206 to remove the calcium. The cation exchange system 206 consists of two parallel columns ("A" and "B") of volume 60 cubic meters each, of diameter 2 meters. The system is operated at a temperature of 60° C. The columns are packed with Dow Monosphere® 88 cation exchange resin, which is described in Example 5. As the sugar stream 202 is fed to a column at a flow rate of 178,000 liters/hr, the sugars, organics, and organic salts 207 elute with very little affinity for the resin. The monovalent cations potassium and ammonium bind to the resin and desorb as these ions have a lower affinity than the divalent ions calcium and magnesium. These cations elute 207 as their sulfate salts. The calcium and magnesium bind to the resin.

After 16 bed volumes of feed 202, magnesium breaks through. Calcium has a higher affinity than magnesium and has not yet broken through. Feed continues until calcium breakthrough, which is after 29 bed volumes of feed. At this point, the feed to column A is stopped and feed to column B is begun. The presence of 2 columns in parallel allows feed of the sugar stream to take place continuously. Column A is washed with a bed volume of water, with the eluent collected and combined with the feed stream 202, so as to not lose the sugar held up in the void of the column.

The sugar stream 207 which has eluted from Column A prior to calcium breakthrough contains less than 3 mg/L calcium and therefore contains substantially no calcium ions. This stream 207 has a flow rate of 192,000 L/hr and a composition of xylose (27 g/L), arabinose (3.4 g/L), glucose (3.0 g/L), galactose (1.5 g/L), and mannose (0.6 g/L). Other organic compounds in the sugar stream include soluble lignin (4.5 g/L), acetic acid (3.3 g/L), glucuronic acid (0.4 g/L), and furfural (0.9 g/L). The sugar stream also contains the inorganic salts ammonium sulfate (10.3 g/L), potassium sulfate (3.9 g/L), and magnesium sulfate (0.5 g/L). The sugar stream also contains the organic salts ammonium acetate (2.7 g/L) and ammonium glucuronate (0.9 g/L). Those skilled in the art are aware that the sugar stream also contains numerous other compounds and that obtaining a complete identification and quantification of these compounds is very difficult.

The sugar stream 207 having had calcium removed is fed to the second cation exchange system 218. The cation exchange system consists of two parallel columns ("C" and "D") of volume 60 cubic meters each, of diameter 2 meters. The system is operated at a temperature of 60° C. The columns are packed with Dow Monosphere 88® cation exchange resin, which is described in Example 5. As the sugar stream 207 is fed to a column at a flow rate of 192,000 liters/hr, the sugars, organics, organic acids, and sulfuric acid elute 230 with very little affinity for the resin. The cations potassium, magnesium, and ammonium bind to the resin, releasing sulfuric acid and organic acids into the eluent stream 230. The feed 207 is continued until the cations break through, which occurs after about 4 bed volumes are fed. At this point, the feed is stopped in Column C and started in Column D. Column C is washed with a bed volume of water, and this wash stream is combined with the feed 207 to maintain sugar yields.

The eluent containing sugar and acids 230 has a flow rate of 206,000 L/hr. This stream has a composition of xylose (24.1 g/L), arabinose (3.1 g/L), glucose (2.7 g/L), galactose (1.4 g/L), and mannose (0.5 g/L). Other organic compounds in the sugar/acid stream include soluble lignin (4.1 g/L), acetic acid (4.6 g/L), glucuronic acid (1.0 g/L), and furfural (1.0 g/L). The sugar/acid stream also contains 9.5 g/L sulfuric acid. Those skilled in the art are aware that the sugar/acid stream also contains numerous other compounds and that obtaining a complete identification and quantification of these compounds is very difficult. This stream is sent to an anion exchange system for further purification.

Column C in the second cation exchange system 218 is then regenerated with 5.5% (w/w) sulfuric acid. This stream is made up from a 93% sulfuric acid stock that is diluted with water. Four bed volumes of regenerant are fed counter-current to the process feed and water wash, that is, in an upward direction. This is sufficient regenerant to desorb the adsorbed cations and convert the resin to the H⁺ form. Column C is then washed with one bed volume of water and the drained acid combined with the acid regenerant pool.

The desorbed salt stream 225 consists primarily of ammonium sulfate, magnesium sulfate, and potassium sulfate salts. This stream has a flow rate of 48,000 L/hr and a composition of 50.4 g/L ammonium sulfate, 19 g/L sulfuric acid, 4.5 g/L magnesium sulfate, and 15.1 g/L potassium sulfate. The stream also contains 5 g/L organic compounds. This stream is suitable for further processing to make fertilizer or other products.

Moving back to the first cation exchange system 206, Column A is regenerated with a clarified salt stream 216, the production of which is described below. This stream has a flow rate of 1760 L/hr of 11.5% ammonium chloride solution. Regeneration is carried out in a direction countercurrent to the loading and bed washing. The ammonium displaces the adsorbed calcium and magnesium cations. After regeneration, Column A is washed with 13,700 L/hr of water to fully displace the desorbed cations. The desorbed salt stream 208 has a flow rate of 15,800 L/hr and is composed of 4.7 g/L calcium chloride and 4.4 g/L magnesium chloride.

The calcium/magnesium chloride stream 208 is subjected to carbon dioxide to precipitate the carbonate salts. Carbon dioxide is added to the precipitation tank 210 at a rate of 61 kg/hr. The precipitation is carried out at ambient temperature in a tank of volume 5000 liters. As the carbon dioxide reacts with calcium or magnesium, it produces a molecule of hydrochloric acid. A stream of 47 kg/hr of ammonia is added to neutralize the HCl and maintain an alkaline pH. The neutralization of HCl with ammonia produces ammonium chloride.

Magnesium carbonate and calcium carbonate have a solubility of about 0.5 g/L. This concentration of the carbonate salts remains in solution. The stream containing calcium carbonate, magnesium carbonate, and ammonium chloride 212 is filtered 214 on a filter press to remove the precipitated salts and produce a dilute clarified salt stream 222. The filter cake is produced at a rate of 316 kg/hr at 41% solids, the solids consisting of 52% calcium carbonate and 48% magnesium carbonate.

The clarified salt stream 222 is evaporated 235 in a 4-effect falling film evaporator. This removes 87% of the water from the stream 222 and produces the concentrated clarified salt stream 216 which contains primarily ammonium chloride that is used to regenerate the first cation exchange system. The small amount of magnesium carbonate and calcium carbonate that are in the stream 222 fed to the evaporator precipitate as the water is removed. The precipitant is removed by washing the surface of the evaporator periodically with dilute hydrochloric acid.

We claim:

1. A process for obtaining a product stream comprising one or more sulfate salts of monovalent cations selected from the group consisting of potassium, sodium, ammonium, and combinations thereof, from a sugar stream resulting from the hydrolysis of a lignocellulosic feedstock, comprising the steps of:
   (i) feeding the sugar stream comprising calcium sulfate and one or more sulfate salts of the monovalent cations to a resin bed that binds calcium to remove calcium, thereby producing a sugar stream containing substantially no calcium ions, and obtaining a salt stream comprising a soluble calcium salt by regenerating the resin bed with a regenerant to produce a regenerated stream comprising the soluble calcium salt;
   (ii) obtaining a feed stream that is either (a) a clarified salt stream derived from the salt stream of step (i) after precipitation and removal of calcium therefrom or (b) the sugar stream containing substantially no calcium ions that is produced in step (i) and wherein said feed stream contains said one or more salts of the monovalent cations;
   (iii) introducing the feed stream obtained in step (ii) to an ion exchange resin bed; and
   (iv) regenerating the ion exchange resin bed of step (iii) with sulfuric acid to produce a product stream comprising one or more sulfate salts of monovalent cations selected from the group consisting of potassium, sodium, ammonium, and combinations thereof.

2. The process according to claim 1,
   wherein the step of treating the sugar stream to remove calcium (step (i)) comprises passing the sugar stream comprising calcium sulfate through a cation exchange resin bed to bind calcium and monovalent cations of the one or more sulfate salts present in said sugar stream to the cation exchange resin bed and obtaining the sugar stream containing substantially no calcium ions from said cation exchange resin bed;
   wherein the salt stream comprising the calcium salt is obtained by regenerating the cation exchange resin bed with a regenerant to form a regenerated stream comprising one or more soluble salts of the monovalent cations bound to said resin and a soluble calcium salt;
   wherein the clarified salt stream is produced by precipitating and removing calcium from the regenerated stream; and
   wherein said feed stream of step (iii) comprising the one or more salts of the monovalent cations is the clarified salt stream.

3. The process according to claim 1, wherein the sugar stream comprising calcium sulfate is obtained by pretreating the lignocellulosic feedstock with sulfuric acid.

4. The process according to claim 1, wherein the sugar stream comprising calcium sulfate further comprises sulfuric acid.

5. The process according to claim 1, wherein the sugar stream comprising calcium sulfate comprises xylose.

6. The process according to claim 1, wherein the sugar stream comprising calcium sulfate comprises magnesium sulfate, potassium sulfate and sodium sulfate.

7. The process according to claim 6, wherein the sugar stream comprising calcium sulfate further comprises ammonium sulfate.

8. The process according to claim 1, wherein the resin bed that binds at least calcium is an ion exchange resin bed.

9. The process of claim 8, wherein the ion exchange resin bed that binds at least calcium is a chelating resin bed or a cation exchange resin bed.

10. The process according to claim 2, wherein the regenerant for regenerating the cation exchange resin bed of step (i) is an acid.

11. The process according to claim 10, wherein the acid is hydrochloric acid, and said regenerated stream comprises potassium chloride and calcium chloride.

12. The process according to claim 11, wherein the regenerated stream further comprises ammonium chloride.

13. The process according to claim 2, wherein the sugar stream comprising calcium sulfate further comprises magnesium sulfate and wherein:
    the regenerated stream further comprises soluble magnesium salts; and
    said process further comprises precipitating magnesium present in the regenerated stream.

14. The process according to claim 2, wherein calcium is precipitated from the regenerated stream by addition of carbon dioxide to the regenerated stream.

15. The process according to claim 2, wherein calcium is precipitated from the regenerated stream by addition of a carbonate salt to the regenerated stream.

16. The process according to claim 14, wherein an alkali is added in combination with the carbon dioxide and wherein said alkali is selected from the group consisting of ammonium hydroxide, potassium hydroxide, sodium hydroxide and ammonia.

17. The process according to claim 16, wherein the alkali is ammonia and wherein the insoluble calcium salt formed is calcium carbonate.

18. The process according to claim 2, wherein calcium precipitated from said regenerated stream is removed by a solids-liquid separation technique selected from the group consisting of centrifugation, microfiltration, plate and frame filtration, crossflow filtration, pressure filtration, settling and vacuum filtration.

19. The process according to claim 12, wherein the regenerated stream comprises a portion of the acid used for regenerating and wherein some or all of said portion of the acid is recovered.

20. The process according to claim 19, wherein some or all of the recovered acid is used to regenerate the cation exchange resin bed.

21. The process according to claim 19, wherein the acid used for regenerating is hydrochloric acid.

22. The process according to claim 1 or 2, wherein the ion exchange resin bed of step (iii) is a cation exchange resin bed.

23. The process according to claim 1, wherein
the sugar stream containing substantially no calcium ions further comprises one or more sulfate salts of monovalent cations selected from potassium, sodium, ammonium, and combinations thereof; and
said feed stream comprising the one or more salts of the monovalent cations fed to the ion exchange resin bed of step (iii) is the sugar stream containing substantially no calcium ions.

24. The process according to claim 23,
wherein the resin bed in the step of treating the sugar stream to remove calcium (step (i)) is a cation exchange resin bed and wherein the sugar stream containing substantially no calcium ions comprises ammonium sulfate, potassium sulfate or a combination thereof.

25. The process according to claim 24, wherein the salt stream comprising a calcium salt is obtained by regenerating the cation exchange resin bed of step (i) with a regenerant to form a regenerated stream comprising one or more soluble salts of cations bound to said resin bed, said regenerated stream comprising a soluble calcium salt;
said process further comprising precipitating calcium present in the regenerated stream to form an insoluble calcium precipitate; and
removing said insoluble calcium precipitate therefrom to obtain a salt stream comprising the insoluble calcium precipitate and a clarified salt stream containing substantially no calcium ions.

26. The process according to claim 25, wherein calcium is precipitated from the regenerated stream by addition of carbon dioxide to the regenerated stream.

27. The process according to claim 25, wherein calcium is precipitated from the regenerated stream by addition of a carbonate salt to the regenerated stream.

28. The process according to claim 26, wherein an alkali is added in combination with the carbon dioxide and wherein said alkali is selected from the group consisting of ammonium hydroxide, potassium hydroxide, sodium hydroxide and ammonia.

29. The process according to claim 28, wherein the alkali is ammonia and wherein the insoluble calcium salt formed is calcium carbonate.

30. The process according to claim 25, wherein calcium precipitated from said regenerated stream is removed by a solids-liquid separation technique selected from the group consisting of centrifugation, microfiltration, plate and frame filtration, crossflow filtration, pressure filtration, settling and vacuum filtration.

31. The process according to claim 25, wherein the regenerant used to regenerate the cation exchange resin bed of step (i) is a regenerant solution comprising one or more chloride salts and wherein said clarified salt stream is a solution comprising ammonium chloride, potassium chloride or a combination thereof.

32. The process according to claim 31, wherein the regenerant solution used to regenerate the cation exchange resin bed is the clarified salt stream comprising ammonium chloride, potassium chloride or a combination thereof.

33. The process according to claim 32, wherein the clarified salt stream comprising ammonium chloride, potassium chloride or a combination thereof is concentrated by removing water therefrom prior to said clarified salt stream being used to regenerate the cation-exchange resin bed.

34. The process according to claim 23, wherein the step of treating the sugar stream comprising calcium sulfate to remove calcium (step (i)) comprises passing the sugar stream through a chelating resin bed that binds calcium ions, and wherein the sugar stream containing substantially no calcium ions further comprises—potassium sulfate.

35. The process according to claim 34, wherein the sugar stream containing substantially no calcium ions further comprises ammonium sulfate.

36. The process according to claim 23, wherein the resin bed that binds at least calcium is a chelating resin bed and wherein the chelating resin bed is regenerated to produce a regenerated stream comprising a soluble calcium salt.

37. The process according to claim 36, wherein the sugar stream containing substantially no calcium ions comprises potassium sulfate.

38. The process according to claim 36, wherein the sugar stream containing substantially no calcium ions comprises ammonium sulfate and potassium sulfate.

39. The process according to claim 36, wherein the chelating resin bed is regenerated with an acid.

40. The process according to claim 39, wherein the acid is hydrochloric acid and wherein the soluble calcium salt is calcium chloride.

41. The process according to claim 40, wherein the regenerated stream comprising the soluble calcium salt further comprises a portion of the hydrochloric acid used to regenerate the chelating resin bed and wherein the regenerated stream is treated with calcium hydroxide to convert some or all of said portion of the hydrochloric acid to calcium chloride.

42. The process according to claim 36, further comprising treating the regenerated stream comprising the soluble calcium salt to precipitate calcium and form an insoluble calcium precipitate; and
removing said insoluble calcium precipitate therefrom to obtain a salt stream comprising the insoluble calcium precipitate and a clarified salt stream containing substantially no calcium ions and at least one salt of a monovalent cation.

43. The process according to claim 42, wherein the at least one salt of a monovalent cation present in the clarified salt stream is produced during said step of treating the regenerated stream to precipitate calcium by addition of carbon dioxide and an alkali containing a monovalent cation, or by addition of a carbonate salt containing a monovalent cation.

44. The process according to claim 42, wherein the at least one salt of a monovalent cation present in the clarified salt stream is converted to its sulfate salt by passing the clarified salt stream through a cation exchange resin bed to bind cations and wherein the cation exchange resin bed is regenerated with sulfuric acid to convert cations bound to the cation exchange resin bed to their sulfate salts.

45. The process according to claim 44, wherein a stream comprising acid is obtained by passing the clarified salt stream through the cation exchange resin bed.

46. The process according to claim 45, wherein some or all of the stream comprising acid is used to regenerate the chelating resin bed.

47. The process according to claim 46, wherein the acid in the stream comprising an acid is hydrochloric acid.

48. The process according to claim 1,
wherein the sugar stream resulting from the hydrolysis of a lignocellulosic feedstock comprises magnesium sulfate and potassium sulfate;
wherein treating the sugar stream to remove calcium comprises passing the sugar stream through a cation exchange resin bed, bound with cations comprising potassium, to bind calcium, magnesium and potassium ions of the sulfate salts present in said sugar stream to the resin bed to obtain the sugar stream comprising substantially no calcium ions, which sugar stream comprises potassium sulfate;
wherein the salt stream comprising the calcium salt is obtained by regenerating the cation exchange resin bed with a solution containing potassium chloride to obtain a regenerated stream comprising calcium chloride, magnesium chloride and potassium chloride;
said process further comprising
precipitating calcium carbonate and magnesium carbonate from said regenerated stream by adding to the regenerated stream an alkali selected from the group consisting of potassium hydroxide, sodium hydroxide, ammonium hydroxide, ammonia and combinations thereof and carbon dioxide together or in combination, or by adding to the regenerated stream a carbonate salt to produce calcium carbonate and magnesium carbonate precipitates;
removing the calcium carbonate and magnesium carbonate precipitates therefrom to produce a clarified salt stream, which clarified salt stream comprises potassium chloride;
evaporating the clarified salt stream to obtain an evaporated salt stream comprising potassium chloride; and
recirculating the evaporated salt stream comprising potassium chloride to regenerate the cation exchange resin bed, and
wherein said feed stream comprising the one or more salts of the monovalent cations fed to the ion exchange resin bed of step (iii) is the sugar stream containing substantially no calcium ions, which ion exchange resin bed is a cation exchange resin bed.

49. A process for obtaining a product stream comprising one or more sulfate salts of monovalent cations selected from the group consisting of potassium, sodium, ammonium, and combinations thereof, from a sugar stream resulting from the hydrolysis of a lignocellulosic feedstock, said sugar stream comprising calcium sulfate and one or more sulfate salts of the monovalent cations, said process comprising the steps of:
(i) treating the sugar stream to remove calcium by passing the sugar stream through a cation exchange resin bed to bind calcium to the resin bed, thereby producing a sugar stream containing substantially no calcium ions, wherein cations of one or more of the sulfate salts of the monovalent cations present in the sugar stream comprising calcium sulfate also bind to the resin bed, and wherein a salt stream comprising a calcium salt is obtained by regenerating the cation exchange resin bed with a regenerant to form a regenerated stream comprising one or more soluble salts of the monovalent cations bound to said resin and a soluble calcium salt;
(ii) obtaining a clarified salt stream derived from the regenerated stream of step (i) after precipitation and removal of calcium therefrom, said clarified salt stream comprising at least one of potassium, ammonium and sodium salts;
(iii) introducing the clarified salt stream of step (ii) to a cation exchange resin bed; and
(iv) regenerating the cation exchange resin bed of step (iii) with sulfuric acid to produce the product stream.

50. The process according to claim 49, wherein the regenerant for regenerating the cation exchange resin bed of step (i) comprises hydrochloric acid.

51. The process according to claim 49, wherein the precipitation of calcium in step (ii) is carried out by adding to the regenerated stream an alkali selected from the group consisting of potassium hydroxide, sodium hydroxide, ammonium hydroxide, ammonia and combinations thereof and carbon dioxide together or in combination, or by adding to the regenerated stream a carbonate salt to produce a calcium carbonate precipitate.

52. A process for obtaining a product stream comprising one or more sulfate salts of monovalent cations selected from the group consisting of potassium, sodium, ammonium, and combinations thereof, from a sugar stream resulting from the hydrolysis of a lignocellulosic feedstock, said sugar stream comprising calcium sulfate and one or more sulfate salts of the monovalent cations, said process comprising the steps of:
(i) treating the sugar stream to remove calcium by passing the sugar stream through a cation exchange resin bed to bind calcium to the resin bed, thereby producing a sugar stream containing substantially no calcium ions and containing one or more of the monovalent cations present in the sugar stream comprising calcium sulfate;
(ii) introducing the sugar stream containing substantially no calcium ions of step (i) to a cation exchange resin bed;
(iii) regenerating the cation exchange resin bed of step (ii) with sulfuric acid to produce the product stream; and
(iv) regenerating the cation exchange resin bed of step (i) with a regenerant to form a regenerated stream comprising a soluble calcium salt.

53. The process according to claim 52, wherein the regenerant for regenerating the cation exchange resin bed of step (i) comprises a monovalent chloride salt and the regenerated stream of step (iv) comprises calcium chloride.

54. The process according to claim 53 wherein a clarified salt stream derived from the regenerated stream of step (iv) is obtained after precipitation and removal of calcium from the regenerated stream, said clarified salt stream comprising at least one of potassium, ammonium and sodium salts.

55. The process according to claim 54, wherein the precipitation of calcium is carried out by adding to the regenerated stream an alkali selected from the group consisting of potassium hydroxide, sodium hydroxide, ammonium hydroxide, ammonia and combinations thereof and carbon dioxide together or in combination, or by adding to the regenerated stream a carbonate salt to produce a calcium carbonate precipitate.

56. The process according to claim 55, wherein the regenerant for regenerating the cation exchange resin bed of step (i) comprises all or a portion of the clarified salt stream.

57. A process for obtaining a product stream comprising one or more sulfate salts of monovalent cations selected from the group consisting of potassium, sodium, ammonium, and combinations thereof, from a sugar stream resulting from the hydrolysis of a lignocellulosic feedstock, said sugar stream comprising calcium sulfate and one or more sulfate salts of the monovalent cations, said process comprising the steps of:
(i) treating the sugar stream to remove calcium by passing the sugar stream through a chelating resin bed to bind calcium to the resin bed, thereby producing a sugar stream containing substantially no calcium ions and containing one or more of the sulfate salts of the monovalent cations present in the sugar stream comprising calcium sulfate;
(ii) introducing the sugar stream containing substantially no calcium ions of step (i) to a cation exchange resin bed;
(iii) regenerating the cation exchange resin bed of step (ii) with sulfuric acid to produce the product stream; and
(iv) regenerating the chelating resin bed of step (i) with a regenerant to form a regenerated stream comprising a soluble calcium salt.

58. The process according to claim 57, wherein the regenerant for regenerating the chelating resin bed of step (i) comprises hydrochloric acid and the regenerated stream of step (iv) comprises calcium chloride.

59. The process according to claim 58 wherein a clarified salt stream derived from the regenerated stream of step (iv) is obtained after precipitation and removal of calcium from the regenerated stream, said clarified salt stream comprising at least one of potassium, ammonium and sodium salts.

60. The process according to claim 59, wherein the precipitation of calcium is carried out by adding to the regenerated stream an alkali selected from the group consisting of potassium hydroxide, sodium hydroxide, ammonium hydroxide, ammonia and combinations thereof and carbon dioxide together or in combination, or by adding to the regenerated stream a carbonate salt to produce a calcium carbonate precipitate.

61. The process according to claim 60, wherein all or a portion of the clarified salt stream is passed through a cation exchange resin bed that binds cations contained in the clarified salt stream and a stream comprising hydrochloric acid is produced.

62. The process according to claim 61, wherein the regenerant for regenerating the chelating resin bed of step (i) comprises all or a portion of said stream comprising hydrochloric acid.

63. The process according to claim 61, wherein the cation exchange resin bed that binds cations contained in the clarified salt stream is regenerated with sulfuric acid to produce one or more sulfate salts of potassium, ammonium or sodium or combinations thereof.

* * * * *

UNITED STATES PATENT AND TRADEMARK OFFICE
CERTIFICATE OF CORRECTION

PATENT NO. : 8,273,181 B2
APPLICATION NO. : 12/199976
DATED : September 25, 2012
INVENTOR(S) : Brian E. Foody et al.

It is certified that error appears in the above-identified patent and that said Letters Patent is hereby corrected as shown below:

ON COVER PAGE AT (56) FOREIGN PATENT DOCUMENTS:

"DE 241800 C2   11/1974" should read --DE 24 18 800 C2   11/1974--;
"WO 2005099854   10/2005" should read --WO 2005/099854   10/2005--;
"WO 2006007691   1/2006" should read --WO 2006/007691   1/2006--; and
"WO 2008025166   3/2008" should read --WO 2008/025166   3/2008--.

ON COVER PAGE AT (57) ABSTRACT:

Line 4, "[processing" should read --processing--.

COLUMN 1:

Line 36, "land filling" should read --land-filling--.

COLUMN 2:

Line 6, "is" should read --are--.

COLUMN 3:

Line 67, ", 6,709,527" should be deleted.

COLUMN 4:

Line 27, ""Week" should read --"Weak--; and
Line 37, "colourless," should read --colorless,--.

Signed and Sealed this
Fifth Day of February, 2013

Teresa Stanek Rea
*Acting Director of the United States Patent and Trademark Office*

COLUMN 5:

Line 10, "substantially-complete" should read --substantially complete--.

COLUMN 7:

Line 36, "invention 2" should read --invention--.

COLUMN 9:

Line 57, "sulfate.," should read --sulfate,--.

COLUMN 11:

Line 66, "examples" should read --example--.

COLUMN 12:

Line 13, "more" should read --most--.

COLUMN 18:

Line 30, "0.5." should read --0.5 and about 20L.--; and
Line 56, "present" should read --are present--.

COLUMN 21:

Line 5, "K+ and NH$_4$+." should read --K$^+$ and NH$_4^+$.--.

COLUMN 23:

Line 53, "invention" should read --invention,--.

COLUMN 25:

Lines 3-18, "Referring now to various embodiments of aspects of the present invention, FIG. 2 of the drawings shows an alternative embodiment of the invention As shown in FIG. 2, a sugar hydrolyzate stream 202 comprising potassium sulfate, ammonium sulfate, calcium sulfate and magnesium sulfate is fed to a first cation exchanger 206 having a resin bed saturated with potassium and ammonium ions. In this embodiment a sugar stream comprising substantially no calcium ions 207 comprising sugar, potassium sulfate, and ammonium sulfate is obtained from the cation exchanger 206. The resin in first cation exchanger 206 initially binds all of the cations as they are capable of exchanging with potassium and ammonium ions present on the resin. However, calcium and magnesium have a higher affinity for the resin than potassium, ammonium, and sodium, and thereby the resin bed becomes enriched in the divalent cations." should be deleted (duplicate).

COLUMN 26:

Line 60, "depicts" should read --depicting--.

COLUMN 27:

Line 38, "are" should read --is--.

COLUMN 29:

Line 2, "2 U.S. m/ft$^2$)" should read --2 U.S. gpm/ft$^2$)--; and
Line 27, "potassium loading" should read --potassium-loaded--.

COLUMN 30:

Line 67, "was" should read --were--.

COLUMN 31:
Line 15, "1 ml" should read --1 mL--.

COLUMN 32:

Line 11, "is" should read --are--;
Line 38, "$K^+$:NH4$^+$" should read --$K^+$:$NH_4^+$--;
Line 42, "10 ml/min." should read --10 mL/min.--;
Line 44, "$Ca^{2+}$>$Mg^{2+}$>$K^+$>NH4$^+$." should read --$Ca^{2+}$>$Mg^{2+}$>$K^+$>$NH_4^+$.--;
Line 45, "is" should read --are--;
Line 58, "100 ml" should read --100 mL--; and
Line 64, "9 ml/min" should read --9 mL/min--.

COLUMN 33:

Line 3, "is" should be deleted;
Line 6, "KCl: NH4Cl." should read --KCl:NH$_4$Cl.--;
Line 23, "is" should read --are--;
Line 40, "NH4$^+$" should read --NH$_4^+$--; and
Tab 4, "1.03" should read --1.03--.

COLUMN 34:

Line 38, "Liters" should read --liters--.

COLUMN 36:

Line 64, "remain" should read --remains--.

COLUMN 37:

Line 10, "are" should read --is--;
Line 13, "acid" should read --acid.--; and
Line 52, "elute 207 as their sulfate salts" should read --elute sulfate salts as their organic salts 207.--.

COLUMN 38:

Line 21, "230" should be deleted.

COLUMN 42:

Line 13, "comprises-potassium" should read --comprises potassium--.

COLUMN 43:

Line 21, "comprising" should read --comprising:--.

COLUMN 44:

Line 41, "claim 53" should read --claim 53,--.

COLUMN 45:

Line 15, "claim 58" should read --claim 58,--.